(12) United States Patent
Matsuo

(10) Patent No.: US 8,654,678 B2
(45) Date of Patent: Feb. 18, 2014

(54) NODE DEVICE, RECORDING MEDIUM WHERE STORAGE CONTROL PROGRAM IS RECORDED, AND INFORMATION STORING METHOD

(75) Inventor: Hideki Matsuo, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 624 days.

(21) Appl. No.: 12/285,675

(22) Filed: Oct. 10, 2008

(65) Prior Publication Data

US 2009/0052349 A1 Feb. 26, 2009

Related U.S. Application Data

(63) Continuation-in-part of application No. PCT/JP2007/055515, filed on Mar. 19, 2007.

(30) Foreign Application Priority Data

Apr. 12, 2006 (JP) .................................. 2006-110293

(51) Int. Cl.
*H04L 12/28* (2006.01)
*G06F 15/177* (2006.01)

(52) U.S. Cl.
USPC ............................ 370/255; 370/412; 709/221

(58) Field of Classification Search
USPC .......................................... 370/352; 709/206
See application file for complete search history.

(56) References Cited

U.S. PATENT DOCUMENTS

| | | | |
|---|---|---|---|
| 5,453,979 A * | 9/1995 | Schibler et al. | 370/395.32 |
| 5,548,712 A * | 8/1996 | Larson et al. | 714/6.32 |
| 5,805,824 A | 9/1998 | Kappe | |
| 6,993,587 B1 | 1/2006 | Basani et al. | |
| 6,996,678 B1 * | 2/2006 | Sharma | 711/133 |
| 7,099,695 B1 * | 8/2006 | Ngan | 455/562.1 |

(Continued)

FOREIGN PATENT DOCUMENTS

| | | |
|---|---|---|
| EP | 0 778 143 A1 | 6/1997 |
| EP | 1 583 326 A2 | 10/2005 |

(Continued)

OTHER PUBLICATIONS

Japanese Office Action issued in Application No. 2006-110293; Mailed on Mar. 16, 2010 (With Translation).

(Continued)

*Primary Examiner* — Marsha D Banks Harold
*Assistant Examiner* — Christopher Wyllie
(74) *Attorney, Agent, or Firm* — Oliff PLC

(57) ABSTRACT

In a node device included in an information communication system which has a plurality of node devices capable of performing communication with each other via a network, common information shared by the plurality of node devices is stored so as to be spread to the plurality of node devices. The node device includes:
first storing means for storing link information used at the time of performing communication with the node devices, the link information including node information indicative of one or more specific node devices;
means for storing the link information stored in the first storing means into second storing means while participating in the system;
means, when withdrawing from the system, and after that, participating in the system again, for storing the link information obtained from the node device of the node information included in the link information stored in the second storing means into the first storing means.

15 Claims, 12 Drawing Sheets

(56) References Cited

U.S. PATENT DOCUMENTS

| | | | |
|---|---|---|---|
| 7,251,670 | B1 | 7/2007 | Day |
| 7,321,939 | B1* | 1/2008 | Porter ........................... 709/238 |
| 7,685,253 | B1* | 3/2010 | Valia ............................ 709/217 |
| 7,702,760 | B2* | 4/2010 | Latvakoski et al. ........... 709/221 |
| 7,739,239 | B1 | 6/2010 | Cormie et al. |
| 7,783,777 | B1 | 8/2010 | Pabla et al. |
| 8,190,779 | B2* | 5/2012 | Matsuo et al. ................. 709/251 |
| 8,201,262 | B2* | 6/2012 | Matsuo et al. .................. 726/27 |
| 2002/0062336 | A1 | 5/2002 | Teodosiu et al. |
| 2002/0083118 | A1 | 6/2002 | Sim |
| 2002/0095454 | A1 | 7/2002 | Reed et al. |
| 2002/0114341 | A1* | 8/2002 | Sutherland et al. ........... 370/428 |
| 2002/0120597 | A1* | 8/2002 | Bae .................................. 707/1 |
| 2002/0141619 | A1* | 10/2002 | Standridge et al. ........... 382/107 |
| 2002/0143855 | A1* | 10/2002 | Traversat et al. ............. 709/202 |
| 2003/0018930 | A1* | 1/2003 | Mora et al. ...................... 714/42 |
| 2003/0076837 | A1* | 4/2003 | Whitehill et al. .......... 370/395.4 |
| 2003/0126122 | A1 | 7/2003 | Bosley et al. |
| 2003/0140111 | A1 | 7/2003 | Pace et al. |
| 2003/0185233 | A1* | 10/2003 | Ji et al. .......................... 370/466 |
| 2003/0188009 | A1* | 10/2003 | Agarwalla et al. ............ 709/236 |
| 2004/0044727 | A1* | 3/2004 | Abdelaziz et al. ............ 709/203 |
| 2004/0104984 | A1 | 6/2004 | Hall et al. |
| 2004/0122741 | A1 | 6/2004 | Sidman |
| 2004/0122903 | A1* | 6/2004 | Saulpaugh et al. ........... 709/206 |
| 2004/0181607 | A1 | 9/2004 | Xu et al. |
| 2004/0210624 | A1 | 10/2004 | Andrzejak et al. |
| 2004/0215622 | A1* | 10/2004 | Dubnicki et al. ................ 707/10 |
| 2005/0066219 | A1 | 3/2005 | Hoffman et al. |
| 2005/0080788 | A1 | 4/2005 | Murata |
| 2005/0120134 | A1* | 6/2005 | Hubis ........................... 709/238 |
| 2005/0122981 | A1 | 6/2005 | Nabae |
| 2005/0168540 | A1 | 8/2005 | Wilson et al. |
| 2005/0201405 | A1 | 9/2005 | Liu et al. |
| 2005/0223102 | A1 | 10/2005 | Zhang et al. |
| 2005/0243740 | A1* | 11/2005 | Chen et al. .................... 370/256 |
| 2006/0007865 | A1* | 1/2006 | White et al. ................... 370/238 |
| 2006/0023040 | A1 | 2/2006 | Castle et al. |
| 2006/0064503 | A1* | 3/2006 | Brown et al. ................. 709/238 |
| 2006/0080273 | A1* | 4/2006 | Degenaro et al. .................. 707/1 |
| 2006/0087532 | A1 | 4/2006 | Takata et al. |
| 2006/0167972 | A1* | 7/2006 | Zombek et al. ............... 709/202 |
| 2006/0173855 | A1* | 8/2006 | Turner et al. .................... 707/10 |
| 2006/0184667 | A1* | 8/2006 | Clubb et al. ................... 709/224 |
| 2006/0190243 | A1* | 8/2006 | Barkai et al. ....................... 704/8 |
| 2006/0195532 | A1* | 8/2006 | Zlateff et al. ................. 709/206 |
| 2006/0218301 | A1 | 9/2006 | O'Toole et al. |
| 2007/0038950 | A1 | 2/2007 | Taniguchi et al. |
| 2007/0079004 | A1 | 4/2007 | Tatemura et al. |
| 2007/0127503 | A1* | 6/2007 | Zhao .............................. 370/400 |
| 2007/0230482 | A1* | 10/2007 | Shim et al. .................... 370/400 |
| 2007/0288391 | A1 | 12/2007 | Nakamura et al. |
| 2008/0005334 | A1* | 1/2008 | Utard et al. ................... 709/226 |
| 2008/0027898 | A1* | 1/2008 | Matsuo et al. .................... 707/1 |
| 2008/0037536 | A1* | 2/2008 | Padmanabhan et al. ...... 370/389 |
| 2008/0130516 | A1* | 6/2008 | You et al. ...................... 370/254 |
| 2008/0235244 | A1* | 9/2008 | Matsuo ............................ 707/10 |
| 2008/0235321 | A1* | 9/2008 | Matsuo ......................... 709/201 |
| 2008/0244673 | A1* | 10/2008 | Matsuo ......................... 725/114 |
| 2008/0317250 | A1* | 12/2008 | Matsuo et al. ................ 380/279 |
| 2008/0319956 | A1* | 12/2008 | Ushiyama ........................ 707/3 |
| 2009/0037445 | A1* | 2/2009 | Ushiyama .................... 707/100 |
| 2009/0041035 | A1* | 2/2009 | Matsuo et al. ................ 370/400 |
| 2009/0052349 | A1* | 2/2009 | Matsuo ......................... 370/254 |
| 2009/0103702 | A1* | 4/2009 | Allen et al. ............... 379/142.04 |
| 2009/0316687 | A1* | 12/2009 | Kruppa ......................... 370/352 |

FOREIGN PATENT DOCUMENTS

| | | | |
|---|---|---|---|
| EP | 1 587 282 A2 | 10/2005 | |
| EP | 1583326 A2 * | 10/2005 | .............. H04L 29/08 |
| JP | A-09-247159 | 9/1997 | |
| JP | A-10-247909 | 9/1998 | |
| JP | A-2000-358039 | 12/2000 | |
| JP | A-2001-325140 | 11/2001 | |
| JP | A-2002-318720 | 10/2002 | |
| JP | A-2003-099337 | 4/2003 | |
| JP | A-2003-216521 | 7/2003 | |
| JP | A-2004-127074 | 4/2004 | |
| JP | A-2004-524602 | 8/2004 | |
| JP | A-2004-258994 | 9/2004 | |
| JP | A-2004-533030 | 10/2004 | |
| JP | A-2004-355114 | 12/2004 | |
| JP | A-2004-362033 | 12/2004 | |
| JP | A-2005-071227 | 3/2005 | |
| JP | A-2005-353039 | 12/2005 | |
| JP | A-2006-059133 | 3/2006 | |
| JP | A-2006-244494 | 9/2006 | |
| JP | A-2007-280303 | 10/2007 | |
| JP | A-2007-280304 | 10/2007 | |
| WO | WO 02/058453 A2 | 8/2002 | |

OTHER PUBLICATIONS

Rowstron, A. et al., "Pastry: Scalable, decentralized object location and routing for large-scale peer-to-peer systems", Proceedings of 18th IFIP/ACM International Conference on Distributed Systems Platforms (Middleware 2001). Heidelberg, Germany, Nov. 2001.

European Search Report issued in corresponding European Application No. 07738960.9, mailed Nov. 11, 2009.

Office Action issued Jan. 6, 2011 in U.S. Appl. No. 12/222,584.

Uchida et al., "AmorphicNet: Peer-to-Peer Distributed Information Sharing System with Dynamically Organized Index Servers", Technical Report of IEICE, Aug. 16, 2002, pp. 1-6, vol. 102, No. 276 (with Abstract).

Takemoto et al., "Load Balancing Schemes for Dynamic System Configuration in Content-Addressable Network", Technical Report of IEICE, Jul. 29, 2003, pp. 13-18; vol. 103, No. 248 (with Abstract).

Zhao et al., "Tapestry: An Infrastructure for Fault-tolerant Wide-area Location and Routing", University of California, Berkeley, Report No. UCB/CSD-01-1141, Apr. 2001, pp. 1-27.

Ramabhadran et al., "Prefix Hash Tree An Indexing Data Structure over Distributed Hash Tables", 2004.

Sato et al., "Dynamic Search Redirection in Adaptive P2P System", Proceedings Communications, Internet, and Information Technology, Oct.-Nov. 2005, pp. 1-6.

Office Action issued in U.S. Appl. No. 12/232,597 on Mar. 10, 2011.

International Search Report issued in International Application No. PCT/JP2007/055475, mailed on Jun. 26, 2007.

U.S. Appl. No. 12/222,584, in the name of Kentaro Ushiyama, filed Aug. 12, 2008.

U.S. Appl. No. 12/232,597, in the name of Kentaro Ushiyama, filed Sep. 19, 2008.

Iwata et al., "P2P Gijutsu no Kiso Chishiki [1]," *UNIX Magazine*, vol. 20, No. 9, Sep. 1, 2005, pp. 82-107.

Office Action dated Jul. 20, 2011 for U.S. Appl. No. 12/222,584.

Japanese Office Action dated Jun. 7, 2011 for Japanese Patent Application No. 2006-109158 (with translation).

Japanese Office Action dated Jun. 7, 2011 for Japanese Patent Application No. 2006-109159 (with translation).

Dec. 11, 2012 Office Action issued in Japanese Patent Application No. 2010-240413 (with translation).

Yu Kaneko et al., "A Location-based Peer-to-Peer Network in a Ubiquitous Environment", Information Processing Society Paper Submission vol. 46 No. SIG18 (TOD28), Japan, Information Processing Society, Dec. 2005, pp. 1-15.

Jun. 26, 2012 Office Action issued in Japanese Patent Application No. 2010-240413 (with English Translation).

* cited by examiner

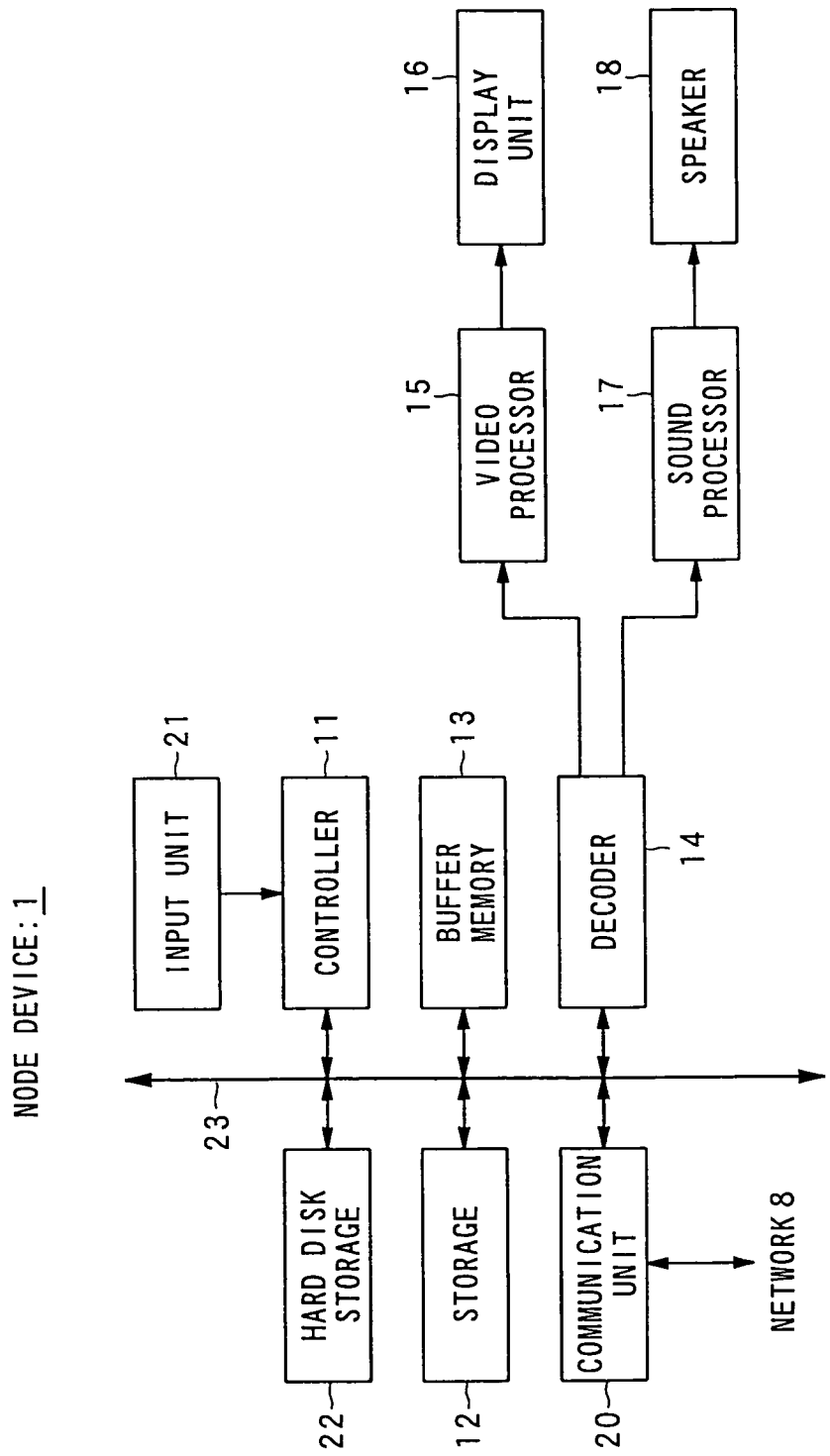

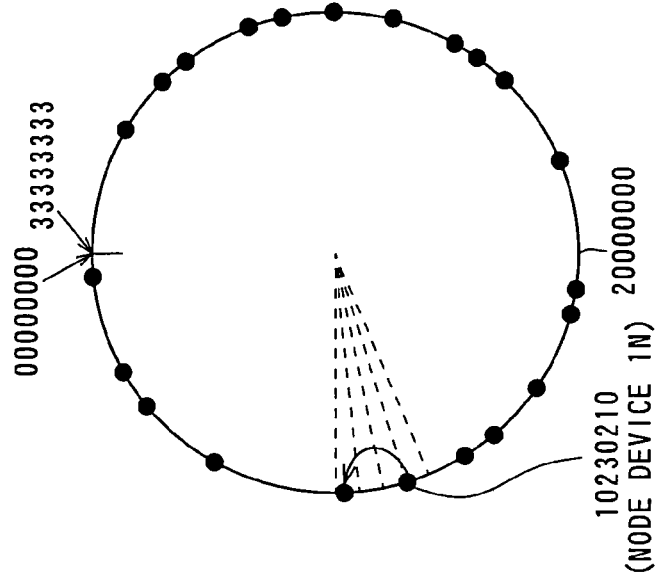
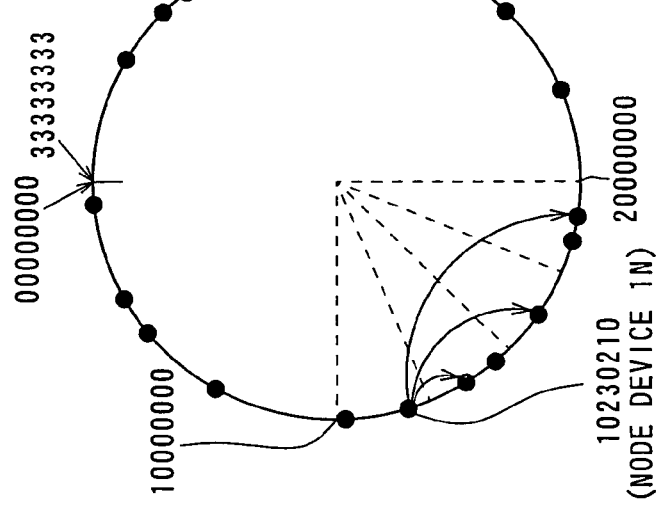
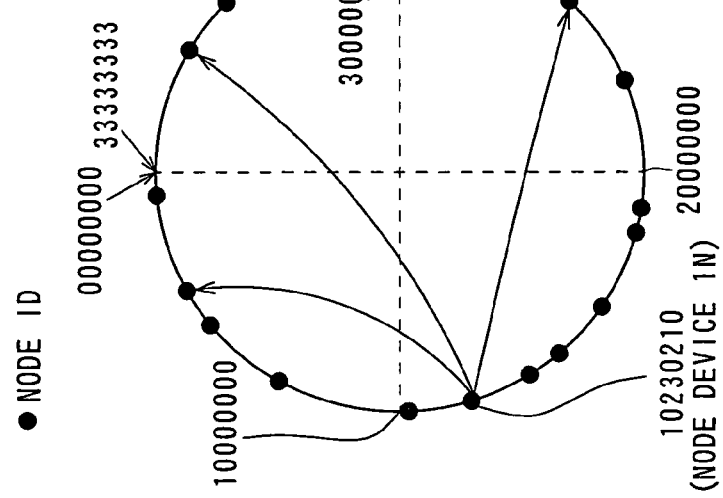

FIG. 4A

| 01300000 | 10230210 | 22031000 | 32201010 |
|---|---|---|---|
| IP ADDRESS 0 | — | IP ADDRESS 2 | IP ADDRESS 3 |

FIG. 4B

| 10230210 | 11320101 | 12020230 | 13210001 |
|---|---|---|---|
| — | IP ADDRESS 4 | IP ADDRESS 5 | IP ADDRESS 6 |

FIG. 4C

| 10000302 | 10230210 | — | — |
|---|---|---|---|
| IP ADDRESS 7 | — | — | — |

FIG. 4D

|  | NOTED DIGIT AT EACH OF LEVELS:0 | NOTED DIGIT AT EACH OF LEVELS:1 | NOTED DIGIT AT EACH OF LEVELS:2 | NOTED DIGIT AT EACH OF LEVELS:3 |
|---|---|---|---|---|
| LEVEL 1 | 01300000 | 10230210 | 22031000 | 32201010 |
|  | IP ADDRESS 0 | — | IP ADDRESS 2 | IP ADDRESS 3 |
| LEVEL 2 | 10230210 | 11320101 | 12020230 | 13210001 |
|  | — | IP ADDRESS 4 | IP ADDRESS 5 | IP ADDRESS 6 |
| LEVEL 3 | 10000302 | — | 10230210 | — |
|  | IP ADDRESS 7 | — | — | — |
| LEVEL 4 | — | — | — | — |
| LEVEL 5 | 10230210 | — | — | — |
| LEVEL 6 | — | — | 10230210 | — |
| LEVEL 7 | — | 10230210 | — | — |
| LEVEL 8 | 10230210 | — | — | — |

NODE DEVICE, RECORDING MEDIUM WHERE STORAGE CONTROL PROGRAM IS RECORDED, AND INFORMATION STORING METHOD

The entire disclosure of the Japanese Patent Application No. 2006-110293, including the specification, the scope of claims, drawings, and abstract, filed on Apr. 12, 2006 is incorporated herein by reference in its entirety.

BACKGROUND OF THE INVENTION

1. Field of the Invention

The present invention relates to the technical field of a node device or the like included in an information communication system which has a plurality of node devices capable of performing communication with each other via a network, and in which a plurality of pieces of common information shared by the plurality of node devices are stored so as to be spread to the plurality of node devices:

2. Discussion of the Related Art

In recent years, an information communication system in which various content such as music and movies is transmitted/received among node devices belonging to a network is actively studied and developed. The information communication system is, for example, a P2P type information communication system in which content is spread to a plurality of node devices and commonly used by the plurality of node devices. Attention is being paid to the P2P-type system as a method of solving concentration of accesses to a server and high management cost as drawbacks of a conventional client-server-type model.

In a peer-to-peer information communication system, for example, in an overlay network logically constructed by using a distributed hash table (hereinbelow, called DHT), each of node devices does not recognize link information (such as destination information) to all of the node devices participating in the overlay network but has, in its RAM (Random Access Memory), as table information, only link information to node devices as a part of the node devices obtained from a contact node device or the like which is accessed first at the time of participating in the overlay network. At the time of inquiring data or the like, a CPU directly accesses the RAM to refer to the table information. Patent documents 1 and 2 disclose techniques using a DHT.

The plurality of pieces of content are stored so as to be spread to the node devices in the system. In addition, information on the location of each content in a node device is also spread and managed as cache information by the node devices.

Patent Document 1: Japanese Unexamined Patent Application Publication No. 2003-99337
Patent Document 2: Japanese Unexamined Patent Application Publication No. 2003-216521

SUMMARY OF THE INVENTION

When a node device participating in such an overlay network withdraws from the system (turns off the power source), link information and the like used for communication with another node device, which is stored in the RAM is lost.

At the time of participating in the overlay network again, the node device has to obtain the link information from the contact node device again.

However, immediately after recovery from a regional blackout or the like, accesses from a number of node devices are concentrated on the contact node device, so that an excessive process burden is placed on the contact node device. The process burden becomes serious as the number of node devices participating in the system increases. There is the possibility that not only the contact node device but also the whole network go down.

The present invention has been achieved in view of the above points, and an object of the invention is to provide a node device, a recording medium where a storage control program is recorded, and an information recording method capable of obtaining latest link information at the time of participating in a system without placing a process burden on a specific node device by obtaining link information used at the time of re-participating in the system on the basis of node information included in the link information stored in a hard disk or the like at the time of re-participating in the system by storing the link information used when the node device is participating in the system into a hard disk or the like from which the link information is not deleted even after withdrawal from the system but remains.

In order to solve the problem, the invention of claim 1 relates to a node device included in an information communication system which has a plurality of node devices capable of performing communication with each other via a network, and in which a plurality of pieces of common information shared by the plurality of node devices are stored so as to be spread to the plurality of node devices, the node device comprising:

first storing means, which is volatile, for storing link information used at the time of performing communication with the node devices, the link information including node information indicative of one or more specific node devices;

first storage control means for storing the link information stored in the first storing means into second storing means which is nonvolatile at a predetermined timing, while the node device itself is participating in the information communication system; and link information obtaining means, when the node device itself withdraws from the information communication system, and after that, participates in the information communication system again, for obtaining the link information to be stored in the first storing means using the node information included in the link information stored in the second storing means, the link information obtaining means comprising:

node information reading means for reading the node information included in the link information stored in the second storing means, participation notifying means for transmitting participation notification for notifying the node device of the node information of participation in the information communication system on the basis of the read node information, and participation notification transmission result determining means for determining whether transmission of the participation notification has succeeded or not, wherein when the participation notification transmission result determining means determines that transmission of the participation notification has succeeded, the link information obtaining means obtains the link information stored in the node device as the destination of the participation notification from the node device as the destination of the participation notification; and wherein the node device comprises second storage control means for storing link information obtained by the link information obtaining means in the first storing means.

BRIEF DESCRIPTION OF THE DRAWINGS

FIG. 2 is a block diagram showing an outline configuration example of a node device 1.

FIGS. 3A to 3C are diagrams showing an example of a state where a routing table is generated by a DHT.

FIG. 4A shows an example of a table at level 1. FIG. 4B shows an example of a table at level 2. FIG. 4C shows an example of a table at level 3. FIG. 4D shows an example of a completed routing table.

DETAILED DESCRIPTION OF THE PREFERRED EMBODIMENTS

Figure 1:
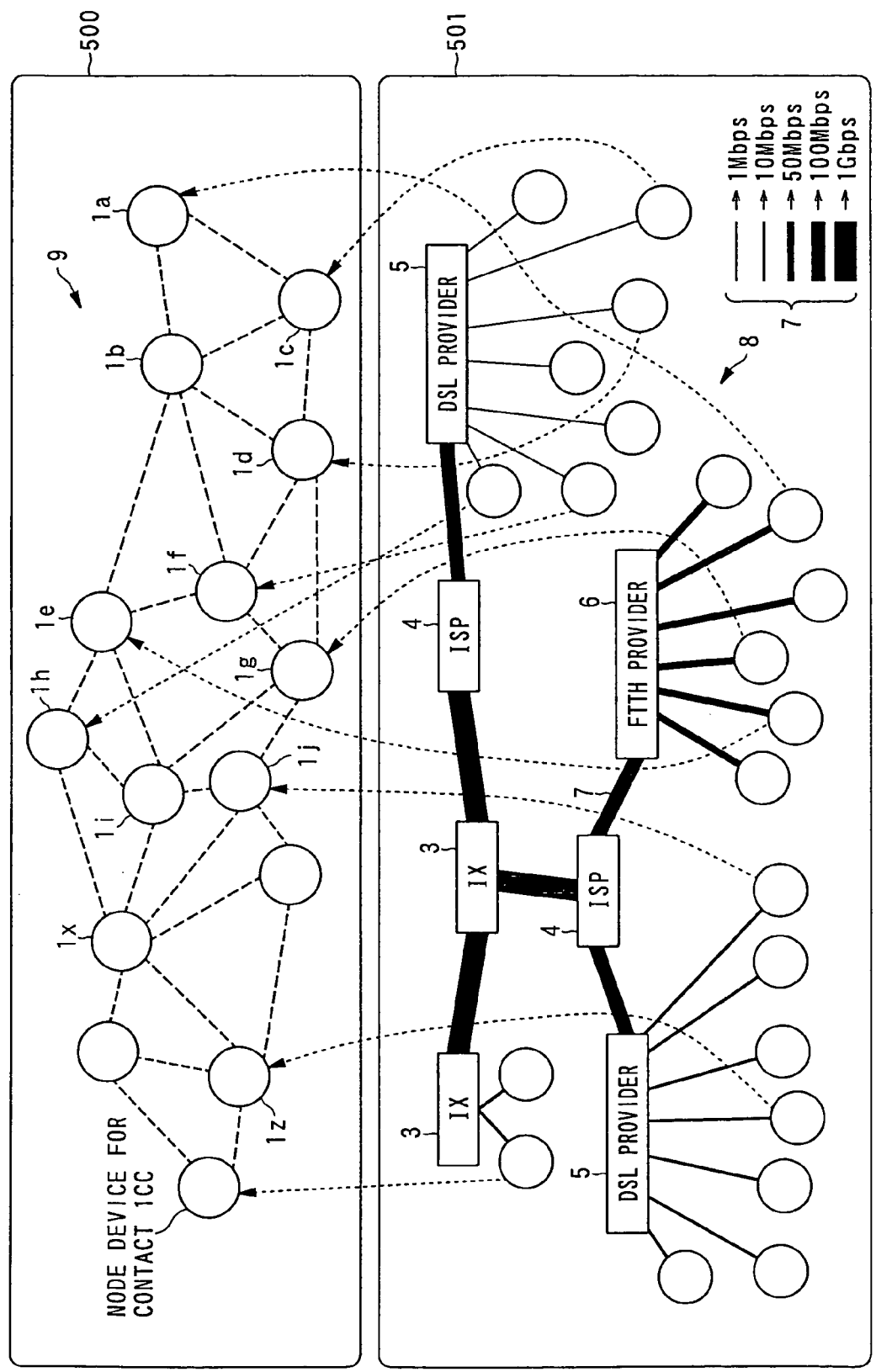
FIG. 1 is a diagram showing an example of a connection mode of each of node devices in a content distribution system as an embodiment.

Each designation of numerical references in the drawings is typically as follows:
1: node device
1CC: node device for contact
3: IX
4: ISP
5: apparatus of DSL provider
6: apparatus of FTTH (Fiber To The Home) provider
7: communication line
8: network
9: overlay network
11: controller
12: storage
13: buffer memory
14: decoder
15: video processor
16: display
17: sound processor
18: speaker
20: communication unit
21: input unit
22: hard disk storage
23: bus
S: content distribution system
1. Configuration and the Like of Content Distribution System First, a schematic configuration and the like of a content distribution system as an information communication system in which information is shared by a plurality of node devices will be described with reference to FIG. 1.

FIG. 1 is a diagram showing an example of a connection mode of node devices in a content distribution system S as an embodiment.

As shown in a lower frame 501 in FIG. 1, a network 8 such as the Internet (network in the real world) is constructed by IXs (Internet eXchanges) 3 as relay devices, ISPs (Internet Service Providers) 4, apparatuses 5 of DSL (Digital Subscriber Line) providers, an apparatus 6 of an FTTH (Fiber To The Home) provider, communication lines (for example, telephone lines, optical cables, and the like) 7, and so on.

To each of node devices 1a, 1b, 1c, . . . , 1x, 1y, 1z, . . . connected to each other via the network 8, destination information of an IP (Internet Protocol) address and a port number and a node ID (identifier) as a unique value for unconditionally identifying the node device are assigned as node information. The same node ID is not assigned to a plurality of node devices. In the following description, in the case of referring to any of the node devices 1a, 1b, 1c, . . . , 1x, 1y, 1z, . . . , it may be called a node device 1 for convenience.

In the content distribution system S, when the node device 1 accesses information of another node device, the node device 1 has to know the destination information such as the IP address of the another node device 1 having the information.

As an example of such a system, an overlay network 9 as shown in an upper frame 500 in FIG. 1 is configured by an algorithm using a DHT. Specifically, the overlay network 9 denotes a network in which a virtual link formed by using the existing network 8 is constructed. The content distribution system S of the embodiment is constructed by a plurality of node devices 1 participating in the overlay network 9.

It is sufficient to unconditionally identify a device by a node ID. For example, a hash value obtained by hashing a serial number, a machine name, or the like which is assigned in advance at the time of shipment from a factory with a common hash function (hash algorithm) is used as a GUID (Global Unique Identifier). The hash value can be used as a node ID for a node device 1.

The number of bits of a node ID has to be large enough to accommodate the maximum number of operating node devices in the content distribution system S. For example, when the number of bits is 128, $2^{128}$ (almost $340 \times 10^{36}$) node devices can be operated. It is expected that SHA-1 (Secure Hash Algorithm 1) (the number of digits generated is 160 bits) and MD5 (Message Digest 5) (the number of digits generated is 120 bits) as known hash functions are used in practice. When the serial numbers or machine numbers are different from each other, the probability that node IDs obtained with the common hash function have the same value is extremely low. Since the hash function is known, the details will not be described.

1-2. Configuration and Function of Node Device

The configuration and function of the node device 1 will now be described. FIG. 2 is a block diagram showing a schematic configuration example of the node device 1. As shown in the diagram, the node device 1 of the embodiment includes: a controller 11 as a computer constructed by a CPU having a computing function, a work RAM (Random Access Memory) (an example first storing means) for storing table information (an example of link information) cache information (an example of location information), catalog information (an example of common information related information), and the like and various data and programs (including a storage control program of the present invention); a storage 12 constructed by an HDD or the like for storing a program (there is also a node device 1 in which no content data is stored); a buffer memory 13 for temporarily storing received content data; a decoder 14 for decoding (decompressing, decrypting, or the like) encoded video data (video information) and audio data (sound information) and the like included in the content data; a video processor 15 for performing a predetermined drawing process on the decoded video data and the like and outputting the resultant data as a video signal; a display unit 16 such as a CRT or a liquid crystal display for displaying a video image on the basis of the video signal output from the video processor 15; a sound processor 17 for digital-to-analog (D/A) converting the decoded audio data to an analog audio signal, amplifying the analog audio signal by an amplifier, and outputting the amplified signal; a speaker 18 for outputting the audio signal output from the sound processor 17 as sound waves; a communication unit 20 for performing communication control on information to/from another node 1 via the network 8; an input unit (such as a keyboard, a mouse, and an operation panel) 21 as input means for receiving an instruction from the user and supplying an instruction signal according to the instruction to the controller 11; and a hard disk storage 22 (an example of second storing means) as rewritable nonvolatile storing means for storing content data, table information, cache information, catalog information, and the like. The controller 11, the storage 12, the buffer memory 13, the decoder 14, the communication unit 20, and the hard disk storage 22 are connected to each other via a bus 23.

When the CPU in the controller 11 executes various programs recorded on the storage 12 or the like, the controller 11 controls the whole operation of the node device 1 in the embodiment in a centralized manner, and functions as, in cooperation with the above-described components; first storing means, second storing means, first storage control means, second storage control means, third storage control means, link information obtaining means, node information reading means, participation notifying means, participation notification transmission result determining means, link information receiving means, node information presence/absence determining means, node information selecting means, deleting means, common information storing means, disclosure notifying means, first storage time determining means, second storage time determining means, and disclosure notification transmission result determining means.

A node device 1CC for contact which is accessed by a node device participating in the content distribution system S for the first time is an example of a participation management node device of the invention. The node device 1CC receives a participation message from a node device 1 which is not yet participated in the system while being participating in the system, and transmits table information stored in itself to the node device 1.

An algorithm using a distributed hash table (hereinbelow, called DHT) of the embodiment and a concrete mechanism of content distribution will be described below. During the description, table information and the like stored in the RAM of the controller 11 as an example of the first storing means of the present invention and the hard disk storage 22 as an example of the second storing means will be described in detail.

1-3. Outline of DHT

An algorithm using a distributed hash table (hereinbelow, called DHT) according to the embodiment will be described below.

The embodiment is based on the overlay network 9 configured by the algorithm using a DHT. The node devices 1 disposed on the overlay network 9 (in the upper frame 500 in FIG. 1) are node devices 1 participating in the overlay network 9, in other words, node devices 1 participating in the content distribution system S.

To participate in such a content distribution system S, a node device 1 which is not participated in the system has to obtain table information (an example of link information) used for communication with another node device, which is the latest table information held by a node device (including the node device 1CC for contact) participating in the system. According to the present invention, when a node device 1 participates in the content distribution system S, the node device 1 stores table information stored in the RAM of the controller 11 and used into the hard disk storage 22. At the time of participating in the system again, the latest table information is obtained on the basis of node information included in the table information stored in the hard disk storage 22. Concretely, a request for participation in the system is sent to the node device 1 related to the node information included in the table information stored in the hard disk storage 22, and the table information is copied. With the configuration, without placing the process load on the fixed node contact 1CC for contact, the latest table information can be obtained.

With reference to FIGS. 3A to 3C, and FIGS. 4A to 4D, an example of the table information generating method will be described. Since the table information is generated (updated) while being transferred among a plurality of node devices, it is also called a routing table.

FIGS. 3A to 3C are diagrams showing an example of a state where a routing table (table information) is generated. FIGS. 4A to 4D are diagrams showing an example of a routing table (table information).

First, as shown in FIG. 4A, an ID space is divided into some areas. The areas are obtained by dividing an ID space in order to generate a routing table. In practice, an ID space is often divided into about 16 areas. For simplicity of explanation, the ID space is divided into four areas, and an ID is expressed in quaternary number of a bit length of 16 bits. The node ID of the node device 1N is set as "10230210", and an example of generating a routing table of the node device 1N will be described.

Routing at Level 1

First, when an ID space is divided into four areas and each of the areas is expressed in quaternary number, the ID space is divided into four areas whose the largest digits are different from each other "0XXXXXXX", "1XXXXXXX", "2XXXXXXX", and "3XXXXXXX" (X denotes a natural number from 0 to 3, also in the following description). The node ID of a certain node device (hereinbelow, called a node device 1N) is "10230210", so that the node device 1N exists in the left lower area "1XXXXXXX" in the diagram. The node device 1N properly selects a node device 1 existing in an area other than the area where it exists (that is, the area "1XXXXXXX") and stores the destination information such as the IP address of the node ID into the table of level 1. FIG. 4A shows an example of the table at level 1. Since the second column denotes the node device 1N itself, it is unnecessary to store the destination information such as the IP address.

Routing at Level 2

Next, as shown in FIG. 3B, the area where the node device 1N exists in the four areas divided by the routing is further divided into four areas "10XXXXXX", "11XXXXXX", "12XXXXXX", and "13XXXXXX". In a manner similar to the above, a node device 1 existing in an area other than the area where the node device 1N exists is properly selected, and the destination information such as the IP address of the node ID is stored into the table of level 2. FIG. 4B shows an example of the table at level 2. Since the first column shows the node device 1N itself, it is unnecessary to store the destination information.

Routing at Level 3

Further, as shown in FIG. 3C, the area where the node device 1N exists in the four areas divided by the routing is further divided into four areas "100XXXXX", "101XXXXX", "102XXXXX", and "103XXXXX". In a manner similar to the above, a node device 1 existing in an area other than the area where the node device 1N exists is properly selected, and the destination information such as the IP address of the node ID is stored into the table of level 1. FIG. 4C shows an example of the table at level 3. Since the third column shows the node device 1N itself, it is unnecessary to store the destination information such as the IP address. Since no node devices exist in the areas in the second and fourth columns, the second and fourth columns are blank.

By generating routing tables similarly at levels 4 to 8 as shown in FIG. 4D, all of IDs of 16 bits can be covered. The higher the level is, the more the blanks are becoming conspicuous in the table.

As described above, each of the node devices 1 stores the destination information such as the IP address of another node device 1 and the area in the node ID, that is, the level in the DHT and the column so as to be associated with each other. To be specific, each node device 1 stores a routing table (hereinbelow, called table information) in the RAM of the controller 11. In the routing table, the destination information such as the IP address of a node belonging to any of a plurality of areas divided is specified as a level in association with the area. The area where the node device 1 exists is further divided into a plurality of areas. The destination information such as the IP address of a node device 1 belonging to any of the divided areas is specified as an address at the next level.

Figure 5A:
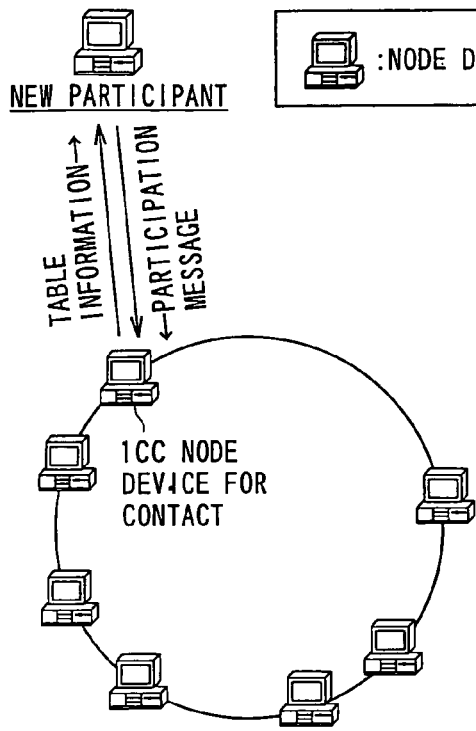
FIGS. 5A and 5D are diagrams showing a state where a node device 1 is going to participate in a content distribution system S, in an ID space of a DHT.

In practice, when a node device 1 which is not participated in the content distribution system S participates in the content distribution system S and obtains the table information as described above, first, if the node device 1 has never participated in the system and is going to participate in the system for the first time (first participation), the node device 1 transmits a "participation message" (an example of participation notification" to the node device 1CC for contact and obtains table information from the node device 1CC for contact (refer to FIG. 5A).

Figure 5B:
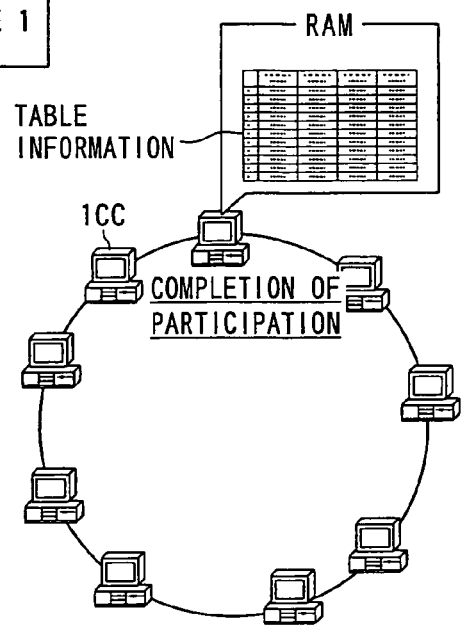
FIGS. 5B and 5C are diagrams showing a state of the node device 1 being participated in the content distribution system S, in an ID space of a DHT.

The node device 1 stores the table information obtained from the node device 1CC for contact into the RAM in the controller 11 while being participated in the system. At the time of transferring a message during retrieval of content or disclosure of content, the stored table information is used and dynamically rewritten to the latest information (refer to FIG. 5B). Concretely, in message transfer, content distribution, or the like, at a timing when the node device 1 knows the existence of another node device 1, the node device 1 determines a column in the table with which the node ID of the another node device 1 matches and additionally writes (updates) the data in the table. At the timing when the node device 1 knows withdrawal of another node device, the node device 1 deletes the node ID of the another node device from the table.

Figure 5C:
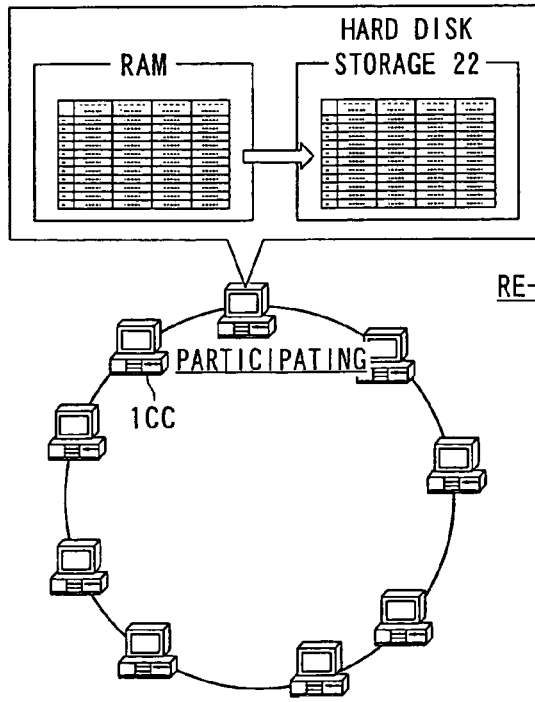
Figure 5D:
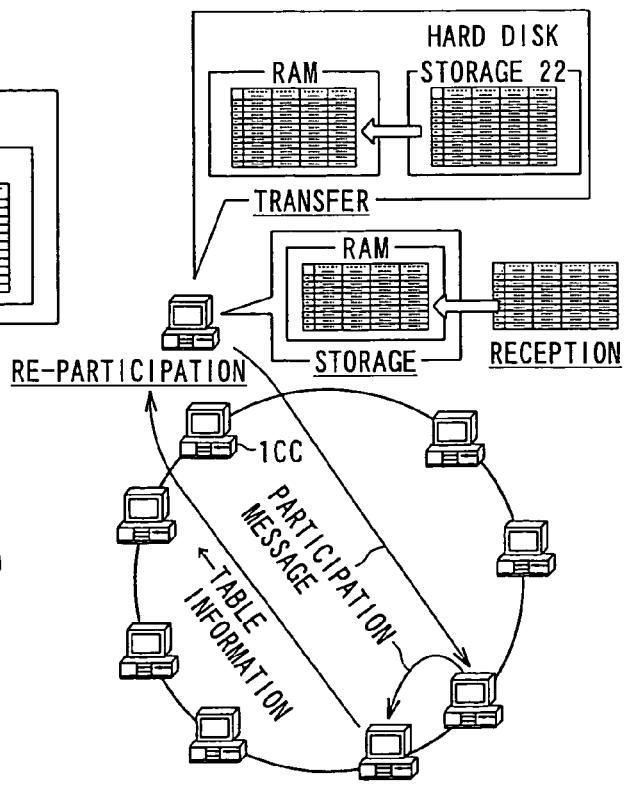

While being participated in the content distribution system S, the node device 1 stores the table information in the RAM of the controller 11 into the hard disk storage 22 (refer to FIG. 5C). When the node device 1 withdraws from the system and participates in the system again, the node device 1 selects the information of a node to which the "participation message" is transmitted from the node information written in the table information stored in the hard disk storage 22 not the node device 1CC for contact. Concretely, the node device 1 transfers (and stores) the table information stored in the hard disk storage 22 temporarily to the RAM of the controller 11 for a work (refer to the arrow in FIG. 5D), selects a node device from the table information, transmits the "participation message" (including the node information of the node device 1 itself and the node ID of the selected node information) to the selected node device 1 in accordance with routing using the node ID of the selected node information as a key, and receives table information (refer to FIG. 5D). The received table information is stored in the RAM in the controller 11 and used for transfer of information to another node device.

Since table information is always dynamically rewritten by transmission/reception of information such as distribution of messages and content, by receiving table information from a node device 1 which is presently participating in the system, the latest table information including a relatively small amount of node information of a node device which has withdrawn from the system and including a relatively large amount of node information of a node device participating in the system can be obtained. In particular, in the case of re-participation in the system, a process load is not placed on the node device 1CC for contact. Therefore, the more convenient system can be provided.

When a node device 1 selects a node device 1 which is presently participating in the system on the basis of the table information (the table information stored in the hard disk storage 22) used when the node device 1 participated in the system in the past, the node device 1 selects a node device 1 whose node ID is relatively far from the node ID of the node device 1 itself. With the configuration, the "participation message" including the node information of; the node device 1 itself can be transferred to a relatively large number of node devices 1, and the presence of itself can be notified to a relatively large number of node devices.

1-4. Storage and Distribution of Content

Storage of content shared by the node devices 1 and distribution of the content will now be described. In a plurality of node devices 1 participating in the content distribution system S, data of content (such as movies and music) as shared information which is distributed from one node device 1 to another node device 1 is stored so as to be spread. A unique content ID is given to each of the content pieces. The content ID has a length similar to that of a node ID (for example, 128 bits). The content ID is determined by a server 100 for supplying content to the content distribution system S and registering the content to the node device 1, and is assigned to each content piece.

Figure 6:
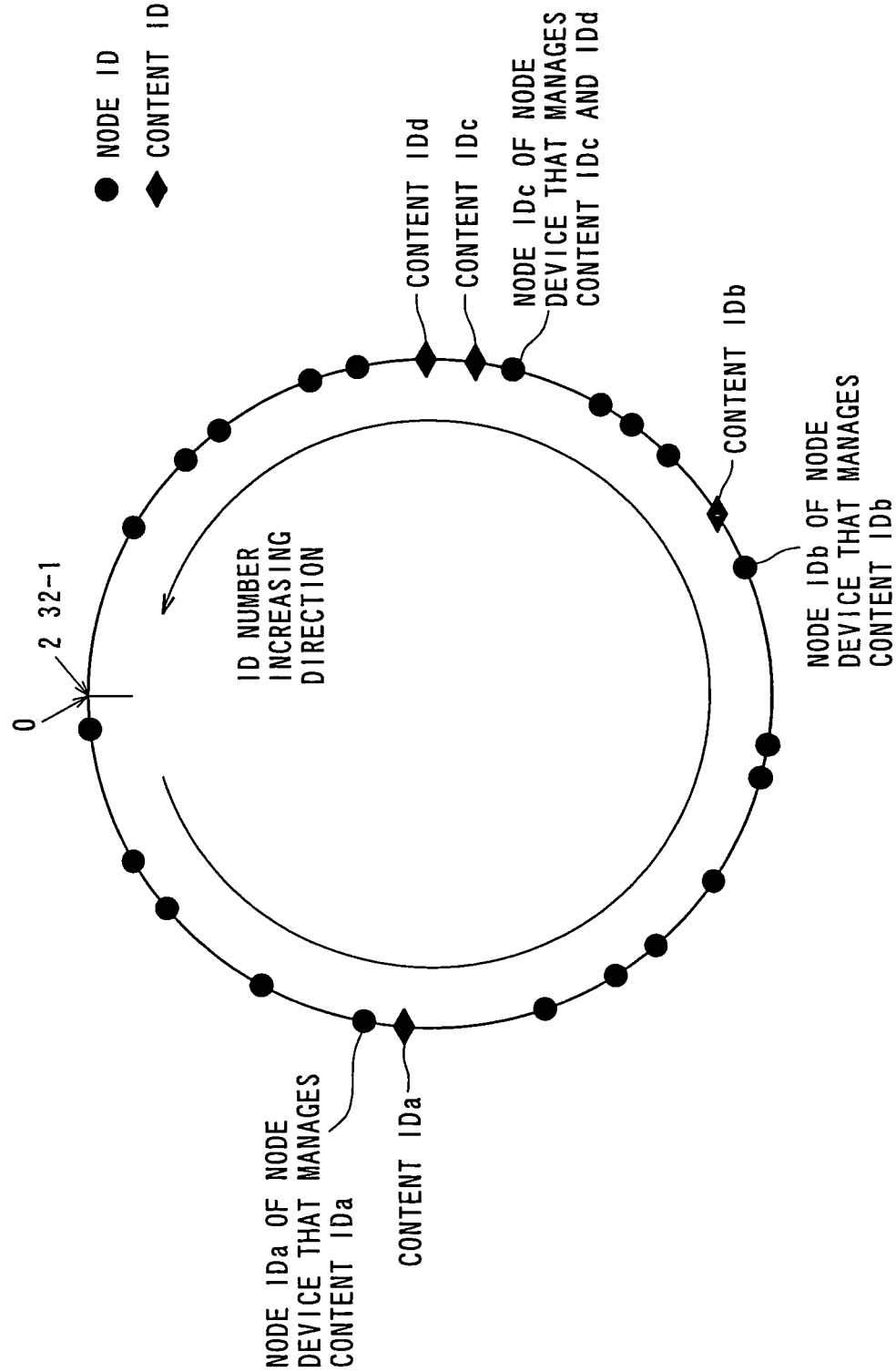
FIG. 6 is a diagram showing an example of content IDs and node IDs in the ID space of the DHT.

FIG. 6 shows a state where node IDs and content IDs each made of 32 bits are assigned and displayed on an ID space. Solid circles in the diagram indicate node IDs, and solid rhomboids indicate content IDs. It is assumed that the number of IDs increases in a counterclockwise direction.

A node device 1 in the ID space as shown in FIG. 6 and content to be controlled by the node device 1 are determined on the basis of whether the content ID and the node ID have a "predetermined relation" or not. The "predetermined relation" is determined under a predetermined rule. The embodiment employs a rule that "a node device which controls content having a certain content ID is a node device 1 having a node ID closest to the certain content ID". That is, a node device having a node ID closest to the content ID (for example, the upper digits in the IDs match the most) and whose value is equal to or less than that of the content ID controls the location information of the node device 1 storing the content.

For example, the "predetermined relation" is defined that the value of the node ID does not exceed that of the content ID, and the difference between the content ID and the node ID is the smallest. In the example shown in the diagram, on the basis of the definition, a content IDa is controlled by a node device having a node IDa, and a content IDb is controlled by a node device having a node IDb. Any definition may be employed as long as a rule of assigning control of content to a node device 1 is consistent.

A certain node device may control a plurality of pieces of different content data like in the case where content IDc and IDd are controlled by a node device 1 having the node IDc. "Control" does not mean storage/retention of content but means "having a knowledge of a node device 1 storing data of content (content data)", that is, storage (caching) of destination information such as the IP address of a node device holding the content.

Table 1 shows an example of cache information which is stored into the RAM of the controller 11 by a node device 1.

TABLE 1

| Content ID | Location information |
|---|---|
| 31330012 | IP address 1 |
| 12013010 | IP address 2 |
| 31001211 | IP address 3 |
| 22123122 | IP address 4 |

The node device 1 receives and obtains destination information such as the IP address (location information of content) included in a "disclosure message" (an example of disclosure notification) transmitted when a node device holding content discloses new content so that the new content can be seen by other node devices participated in the content distribution system S, and writes it to cache information (table 1) stored in the RAM of the controller 11. In the embodiment, not only a node device 1 whose node ID has the predetermined relation with the content ID but also a node device 1 on a path for transferring the "disclosure message" among node devices store the location information of the content as cache information in the RAM in the controller 11.

A process of disclosing content and storing cache information into the RAM in the controller 11 of a node device will be described in detail hereinbelow.

1-5. Disclosure of Content and Storage of Location Information of Content

Figure 7:
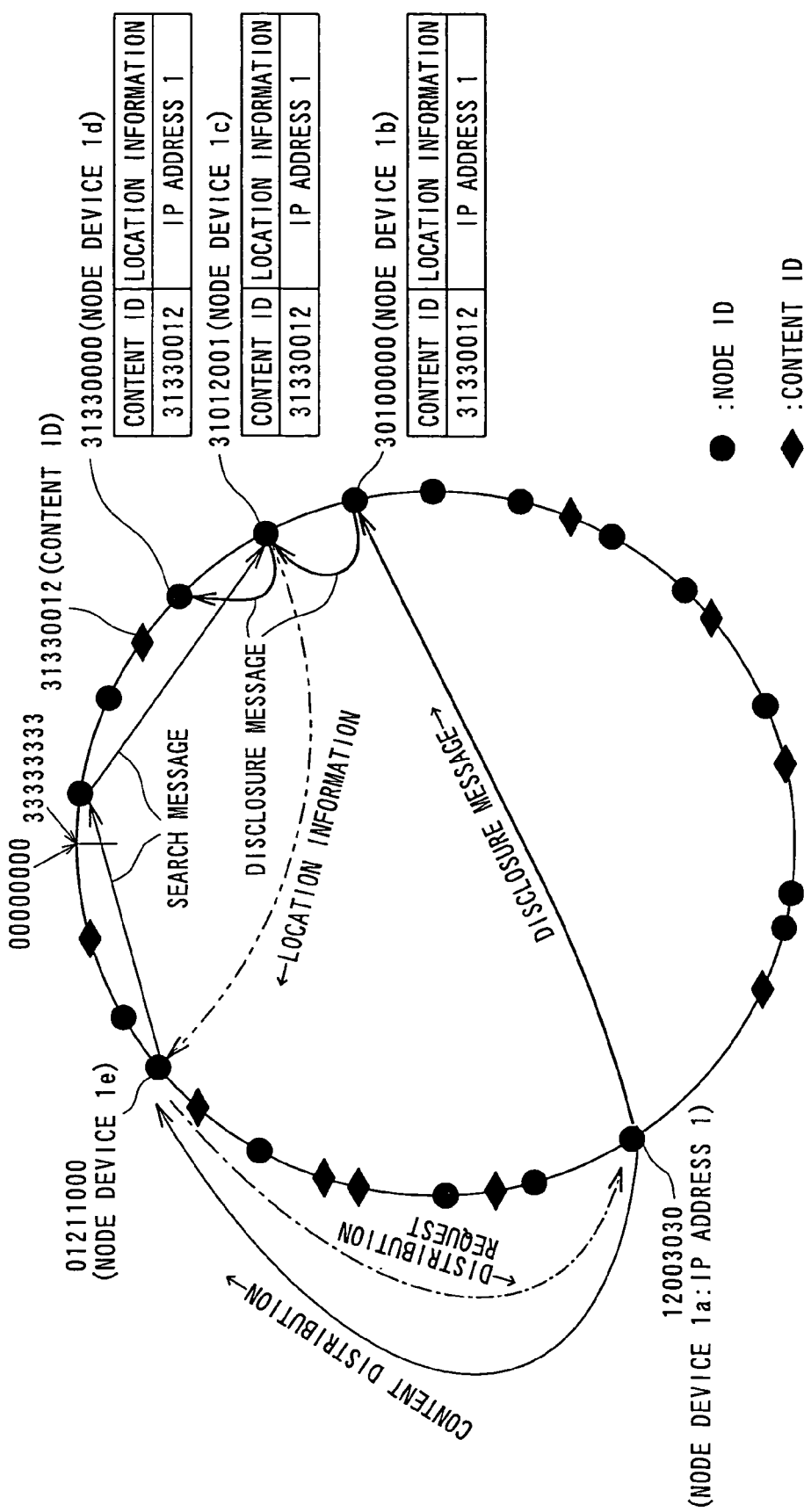
FIG. 7 is a diagram showing a state where content is disclosed, and a state where content is retrieved, in an ID space of a DHT.

FIG. 7 is a diagram showing an example of a state where new content is disclosed using a DHT.

A node device that holds content obtains a content ID from the title of content or the like and transmits the "disclosure message" toward a node device having the same node ID as the content ID (whether the node device actually exists or not is unknown at this time point).

A procedure in the case where the node device 1a having the node ID "12003030" discloses content having a content ID "31330012" held by itself will be described.

First, the node device 1a refers to the table at level 1 in table information (see FIG. 4D) stored in the RAM of the controller 11 and transmits the "disclosure message" to a node device having a node ID in the same area as that of the content ID "31330012". Specifically, since the content ID "31330012" is in the area of "3XXXXXXX", the "disclosure message" is transmitted to the node device 1b which knows the destination information such as the IP address (that is, in which the destination information such as the IP address is stored in the table information) among the node devices 1 belonging to the area "3XXXXXXX".

In the example shown in FIG. 7, the destination information such as the IP address of the node device 1b having the node ID "30100000" is stored in the table information of the node device 1a, so that the node device 1a transmits the "disclosure message" to the node device 1b having the node ID "30100000".

The node device 1b which receives the "disclosure message" refers to the table of level 2 in the table information stored in the RAM in the controller 11 by the node device 1b itself, and transfers the "disclosure message" to the node device 1c (node ID "31012001") which knows the destination information such as the IP address among the node devices 1 belonging to the area "31XXXXXX".

As described above, the "disclosure message" is transferred in a manner of matching the digits of the content IDs from the upper digit, and finally reaches the node device 1d.

The node device 1d to which the "disclosure message" is transferred finally stores the content ID included in the "disclosure message" and, as the location information of content, the IP address "IP address 1" of the node device 1a that holds content. In the embodiment, the node devices 1b and 1c that transfer (relay) the "disclosure message" from the node device 1a for holding content in accordance with table information also store the content ID included in the "disclosure message" and, as the location information of content, the IP address "IP address 1" of the node device 1a that holds content into the cache information stored in the RAM of the controller 11 of itself.

Also when viewing of content is desired, a "search message" for inquiring the location of the content including the content ID is transferred among node devices in accordance with routing using the content ID included in the "search message" as a key. When the "search message" reaches a node device that stores cache information of the content in the RAM, a node device receives the IP address of the node device that holds the content as the location information of the content from the node device. The node device which receives the IP address accesses the node device that holds the content and requests for distribution. In the example shown in FIG. 7, a "search message" including the content ID "31330012" of content to be retrieved, which is transmitted from the node device 1e reaches the node device 1c having the location information of the content ID "31330012" via the other node devices. The node device 1e obtains the "IP address 1" of the node device 1a as the location information of the content whose content ID is "31330012" from the node device 1c. According to the IP address 1, the node device 1e requests the node device 1a to distribute the content and receives distribution of the content from the node device 1a.

The node device 1e which desires distribution of content receives the location information of the content from the node device 1c having the location information of the content, and transmits/receives information. By the operation, the node devices 1c and 1e know the existence of each other. In the node device 1e, the node information (the destination information such as the IP address and the node ID) of the node device 1c is added to the table information stored in the RAM of the controller 11. Similarly, also in the node device 1c, if the node information of the node device 1e does not exist in the table information stored in the RAM of the controller 11, the node information of the node device 1e is added.

The node device 1a holding content and the node device 1e desiring distribution of content perform transmission/reception of information, that is, distribution of content, to/from each other, thereby knowing the existence of each other. In the node device 1a, when the node information of the node device 1e does not exist in the table information stored in the RAM of the controller 11, the node information of the node device 1e is added. Also in the node device 1e, similarly, when the node information of the node device 1a does not exist in the table information stored in the RAM of the controller 11, the node information of the node device 1a is added.

In the embodiment, catalog information (an example of common information related information) is also stored in the RAM of the controller 11. The catalog information constructs a catalog list referred to when distribution of content is desired and content is retrieved, and is commonly used (shared) by other node devices 1. In the catalog information, attribute information of content is written in association with the content ID. Examples of the attribute information are content name (movie title in the case where content is a movie, music piece title in the case where content is a music piece, and program title in the case where content is a broadcasting program), a genre (action, horror movie, comedy movie, love story, and the like in the case where content is a movie; rock, jazz, pops, classic, and the like in the case where content is music; and drama, sports, news, movie, music, animation, variety show, and the like in the case where content is a broadcasting program), artist name (singer, group, and the like in the case where content is music), performer (cast in the case where content is a movie or broadcasting program), and director's name (in the case where content is a movie). The applicant of the present invention has filed patents regarding catalog information commonly used (shared) by other node devices 1 (Japanese Patent Application Nos. 2006-109158 and 2006-109159). Since the method of sharing catalog information among a plurality of node devices 1 is described in detail in the applications, the method will not be described here.

2. Process Operation of Node Device

Subsequently, concrete process operation of each of the node devices 1 will be described with reference to the drawings.

2-1. Main Process

Figure 8:
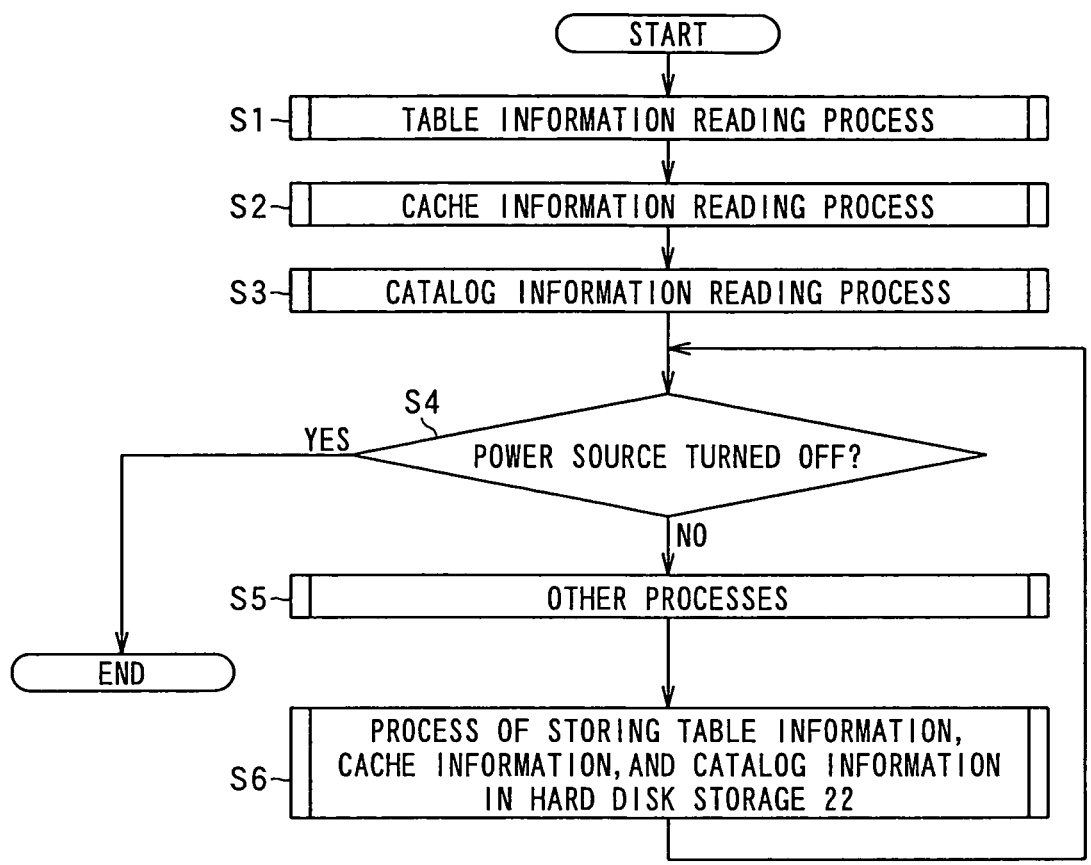
FIG. 8 is a flowchart showing an example of main process in the node device 1.

FIG. 8 is a flowchart showing an example of main, process in the node device 1. The process is executed under control of the controller 11. When the power source of the node device 1 is turned on and, for example, the user operates the input unit 21 to instruct participation to the content distribution system S, the process starts.

First, a process of reading table information (step S1), a process of reading cache information (step S2), and a process of reading catalog information (step S3) are performed. In each of the reading processes, if the node device 1 participated in the content distribution system S in the past, the information is obtained from the hard disk storage 22 and stored into the RAM of the controller 11. The processes in steps S1 to S3 will be described in detail later.

Next, whether the power source is turned off or not is determined (step S4). In the case where the power source is not turned off (No in step S4), "another process" is performed (step S5). The "another process" is a process of transmitting table information of the node device 1 itself in accordance with a "participation message" sent from another node device 1, a content retrieving process (retrieval of a node device that holds content) performed in accordance with a "search message" sent from another node device 1, a content distributing process performed in response to a content distribution request sent from another node device 1, a process of transferring various messages, or the like.

The controller 11 functions as first storage control means and performs a process of storing table information, cache information, and catalog information stored in the RAM into the hard disk storage 22 (step S6). The program moves to step S4.

In such a manner, until it is determined in step S4 that the power source is off, the processes in the steps S5 and S6 are repeatedly performed.

The steps S1 to S3 are processes performed before participation in the content distribution system S. The steps s4 to S6 are processes performed during participation in the content distribution system S.

2-2. Processes of Reading Various Information

The processes of reading table information, cache information, and catalog information executed in the steps S1 to S3 will be described with reference to FIGS. 9 and 10.

2-2-1. Table Information Reading Process

Figure 9:
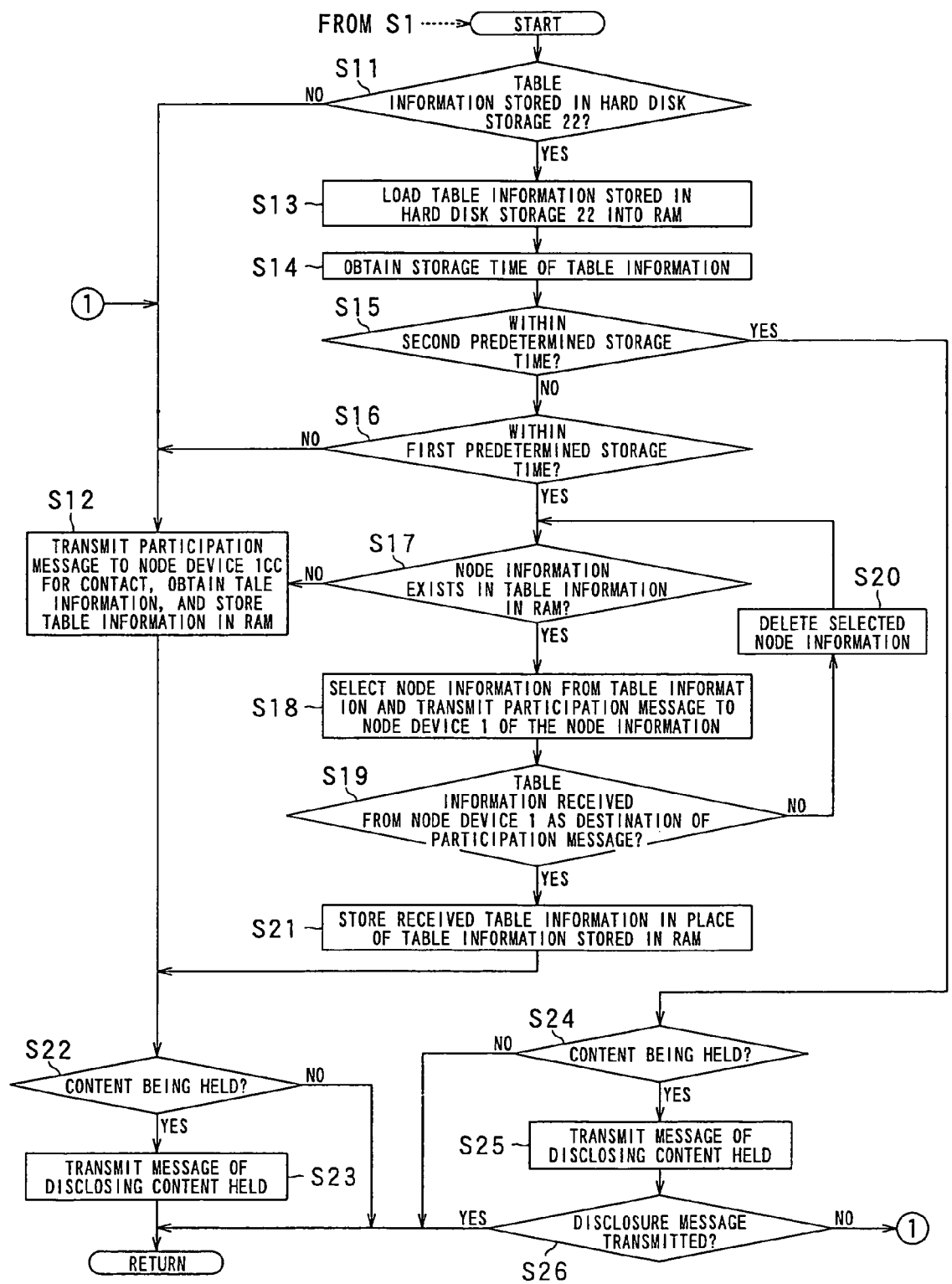
FIG. 9 is a flowchart showing an example of "table information reading process" in the node device 1.

FIG. 9 is a flowchart showing an example of "table information reading process" executed in step S1.

First, whether table information is stored in the hard disk storage 22 or not is determined (step S11). In the case where table information is not stored in the hard disk storage 22 such as the case where the node device 1 has never participated in the content distribution system S in the past and the case where table information stored in the hard disk storage 22 was erased (No in step S11), as shown in FIG. 6A, the "participation message" is sent to the node device 1CC for contact to obtain (receive) table information, and the table information is stored in the RAM (step S12).

On the other hand, in the case where table information is stored in the hard disk storage 22 (Yes in step S11) the controller 11 functions as third storage control means. The controller 11 temporarily reads the table information stored in the hard disk storage 22, stores it to the work RAM (step S13) and, further, obtains storage time indicative of time at which the table information is stored in the hard disk storage 22 from the hard disk storage 22 (step S14).

The controller 11 functions as second storage time determining means and determines whether time lapsed since the storage time until present time (lapse time) is within second predetermined storage time (for example, two hours) or not (step S15). When the lapse time is longer than the second predetermined storage time (No in step S15) the table information (node information in the table information) stored in the hard disk storage 22 is not latest information which can be used as it is at the time of participation in the system this time. Therefore, the controller 11 shifts to a process after the step S16, that is, a process of copying table information from node devices (including the node device 1CC for contact) which are presently participating in the system.

In step S16, the controller 11 functions as first storage time determining means, and determines whether or not time lapsed since the storage time to the present time (lapse time) is within first predetermined storage time (for example, 10 days) longer than the second predetermined storage time used for the determination in step S15 (step S16). When the lapse time is longer than the first predetermined storage time (No in step S16), the controller 11 transmits the participation message" to the node device 1CC for contact, obtains (receives) table information from the node device 1CC for contact, and stores the table information into the RAM (step S12). As described above, when the lapse time is longer than the first predetermined storage time, the table information stored in the hard disk storage 22 is old information. It is considered that even when the participation message is transmitted to a node device in the old table information, the possibility of failure is high. Therefore, table information is obtained from the node device 1CC for contact.

On the other hand, in the case where it is determined in step S16 that the lapse time is within the first predetermined storage time (Yes in step S16), table information is obtained from a node device 1 selected on the basis of the table information. Concretely, first, the controller 11 functions as node information presence/absence determining means and determines whether node information exists in the table information of the RAM or not (step S17). In the case where there is node information in the table information in the RAM (Yes in step S17), the controller 11 functions as node information selecting means and participation notifying means, selects node information from the table information of the RAM, and transmits the "participation message" to a node device 1 corresponding to the node information (step S18).

The controller 11 functions as participation notification transmission result determining means and determines whether transmission of the "participation message" has succeeded or not. Concretely, the controller 11 determines whether table information can be received from the node device as the destination of the "participation message" or not (step S19). The node device as the destination of the "participation message" is a node device to which the message is supplied by routing using, as a key, the node ID included in the "participation message" (selected in step S18).

When it is determined that the table information cannot be received (No in step S19), the controller 11 functions as deleting means, erases the node information selected in step S18 from the table information (step S20), and returns to step S17. The table information stored in the hard disk storage 22 is table information which was used by the node device 1 performing the process when the node device 1 participated in the content distribution system S last time. Consequently, in the case where considerably long time has lapsed since the participation of last time, a node device which was participated in the system in the participation of last time withdrew from the system as time elapses. As described above, in the case where the node device 1 which receives the "participation message" first has already withdrawn, the case where a communication error occurs during relay of the "participation message" among the plurality of node devices 1, and the like, the table information cannot be received. Until node information in the table information is selected in step S18 and it is determined that there is no node information in the table information (No in step S17) or until reception of table information is confirmed (Yes in step S19), the processes in the steps S17 to S19 are repeatedly performed.

When the controller 11 functions as link information receiving means and reception of table information is confirmed (Yes in step S19), the controller 11 functions as second storage control means and stores the received table information into the RAM in place of the table information transferred to (and stored in) the work RAM in step S13 (step S21).

In the case where it is determined in step S17 that there is no node information in table information (No in step S17), in a manner similar to the case where the node device 1 participates in the content distribution system S for the first time, the controller 11 shifts to the step S12, transmits the "participation message" to the node device 1CC for contact, receives table information, and stores the table information into the RAM.

Subsequently, the controller 11 determines whether content to be commonly used by other node devices 1 participating in the system is stored (held) in the storage 12 or not (step S22). In the case where content to be shared is not stored in the storage 12 (No in step S22), the process is finished. In the case where content to be shared is stored in the storage 12 (Yes in step S22), the controller 11 functions as disclosure notifying means, transmits a "disclosure message" on the basis of the table information stored in the RAM in step S12 or S21 with respect to the content held (step S23), and finishes the process.

In the case where it is determined in step S15 that the time lapsed since the storage time until present time (lapse time) is within second predetermined storage time (Yes in step S15), the controller 11 moves to processes of steps S24 to S26. That is, when the table information obtained from the hard disk storage 22 in step S13 is new (in the case such that the node device 1 withdraws from the system and re-participates in the system soon (for example, within two hours)), the possibility that table information (node information in the table information) used when the node device 1 participated in the system last time is still latest information is high. Therefore, the table information used last time is used as it is.

Whether content to be shared by other node devices 1 participating in the system is stored (held) in the storage 12 or not is determined (step S24). In the case where the content to be shared is not stored in the storage 12 (No in step S24), the process is finished. In the case where the content to be shared is stored in the storage 12 (Yes in step S24), the controller 11 functions as disclosure notifying means and transmits the "disclosure message" on the basis of the table information stored in the RAM in step S13 with respect to content held (step S25).

Next, the controller 11 functions as disclosure notification transmission result determining means and determines whether transmission of the "disclosure message" has succeeded or not (step S26). Concretely, when reception acknowledgement notification is received from a node device as a first destination of the "disclosure message", it is determined that transmission of the message has succeeded. When the reception acknowledgement notification is not received from a node device as the first destination after predetermined wait time (timeout occurs), it is determined that transmission of the message has failed. The node device as the first destination of the "disclosure message" is the node device 1b in the example shown in FIG. 7. In the case where transmission of the "disclosure message" succeeds (Yes in step S26), the process is finished. In the case where transmission of the "disclosure message" fails (No in step S26), the table information stored in step S13 is deleted from the RAM. The controller 11 moves to step S12, obtains the table information from the node device 1CC for contact, and stores it in the RAM.

As described above, in the case where the node device re-participates in the system and uses table information stored in the hard disk storage 22, whether the table information can be used or not is determined by determining whether the "disclosure message" can be transmitted or not. In the case where transmission of the disclosure message fails, the possibility that the node device 1 related to the remaining node information in the table information stored in the hard disk storage 22 is not participating in the system is determined high. Consequently, the latest table information is obtained from the node device 1CC for contact.

In step S13, various works of temporarily reading table information stored in the hard disk storage 22, storing it into the RAM, and selecting node information from the table information are performed. Alternatively, without storing the table information into the RAM, in a state where the table information is stored in the hard disk storage 22, the CPU accesses the table information stored in the hard disk storage 22 via the bus 23. With the configuration, the controller 11 functions as node information reading means for reading node information included in the table information stored in the hard disk storage 22 and transmitting the "participation message" to a node device of the node information.

2-2-2. Cache Information Reading Process

Figure 10A:
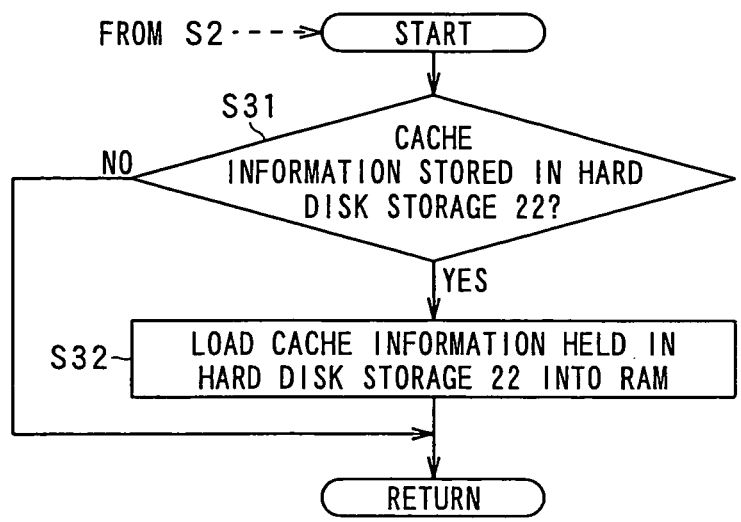
FIG. 10A is a flowchart showing an example of "cache information reading process" in the node device 1.

A cache information reading process in step S2 will be described with reference to the flowchart showing an example of "cache information reading process" in FIG. 10A.

First, whether cache information is stored in the hard disk storage 22 or not is determined (step S31). In the case where cache information is not stored in the hard disk storage 22 such as a case where the node device 1 has not participated in the content distribution system S in the past (No in step S31), the process is finished as it is.

On the other hand, in the case where cache information is stored in the hard disk storage 22 (Yes in step S31), the controller 11 functions as second storage control means, reads cache information stored in the hard disk storage 22, stores it to the RAM (step S32), and finishes the process.

2-2-3. Catalog Information Reading Process

Figure 10B:
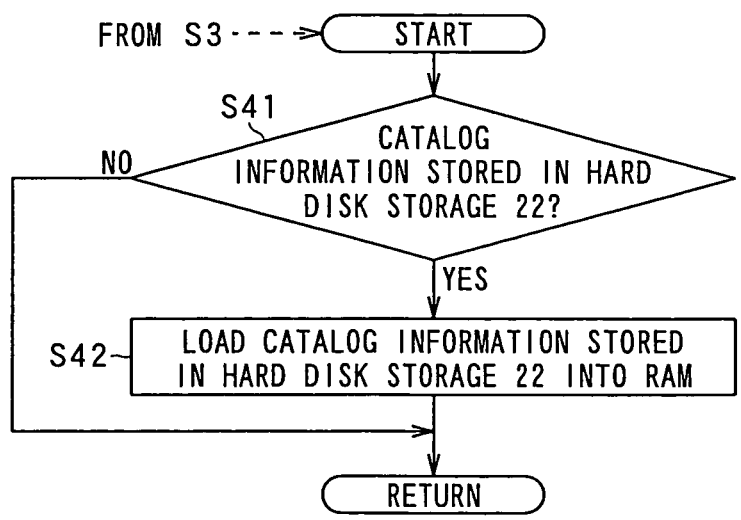
FIG. 10B is a flowchart showing an example of "catalog information reading process" in the node device 1.

A catalog information reading process in step S3 will be described with reference to the flowchart showing an example of "catalog information reading process" in FIG. 10B. The process is similar to the "cache information reading process".

First, whether catalog information is stored in the hard disk storage 22 or not is determined (step S41). In the case where catalog information is not stored in the hard disk storage 22 such as a case where the node device 1 has never participated in the content distribution system S in the past (No in step S41), the process is finished as it is.

On the other hand, in the case where catalog information is stored in the hard disk storage 22 (Yes in step S41), the controller 11 functions as second storage control means, reads catalog information stored in the hard disk storage 22, stores it to the RAM (step S42), and finishes the process.

2-3. Process for Storing Various Information

Figure 11:
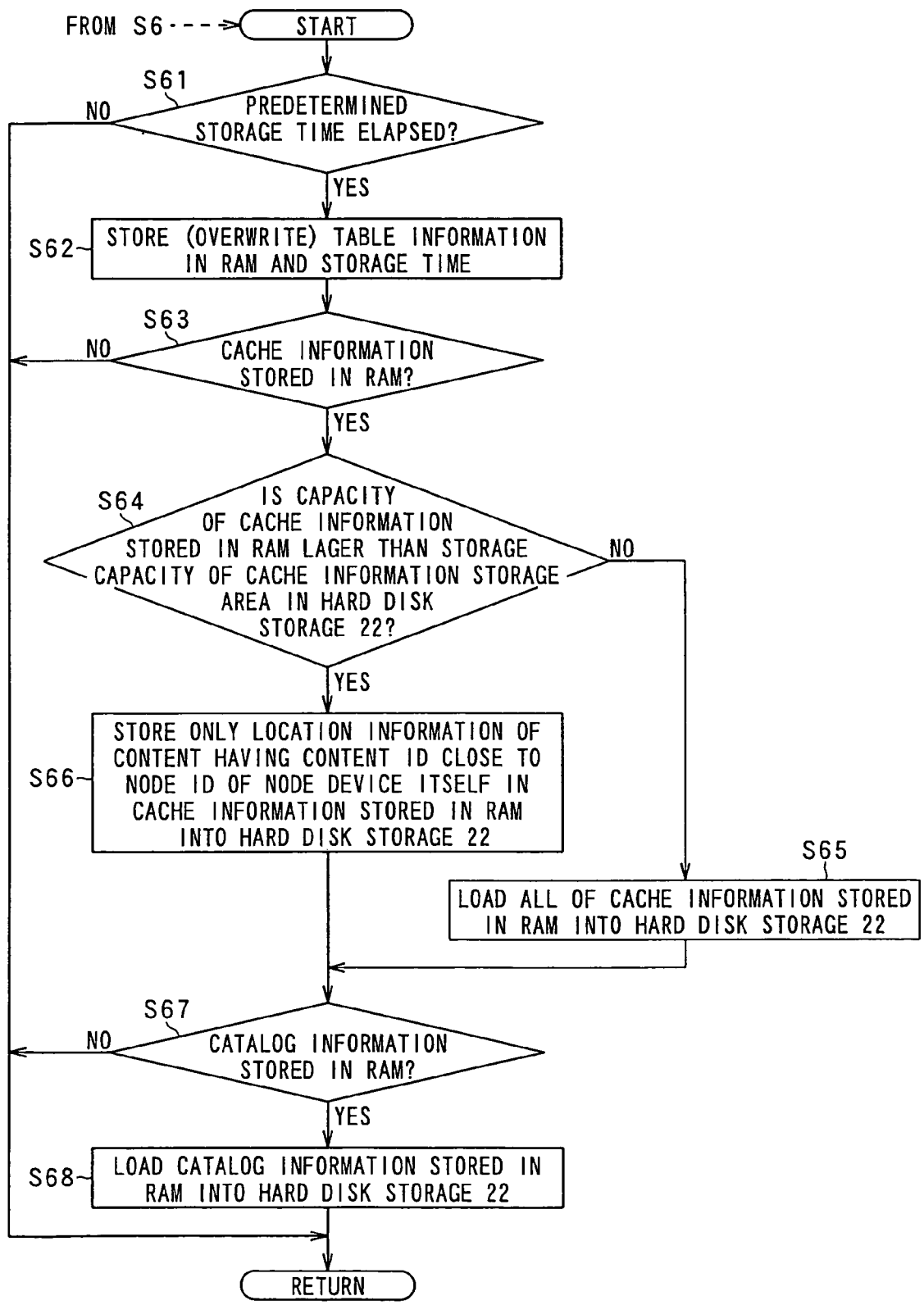
FIG. 11 is a flowchart showing an example of "process of storing table information, cache information, and catalog information stored in an RAM into a hard disk storing unit 22" in the node device 1.
Figure 12:
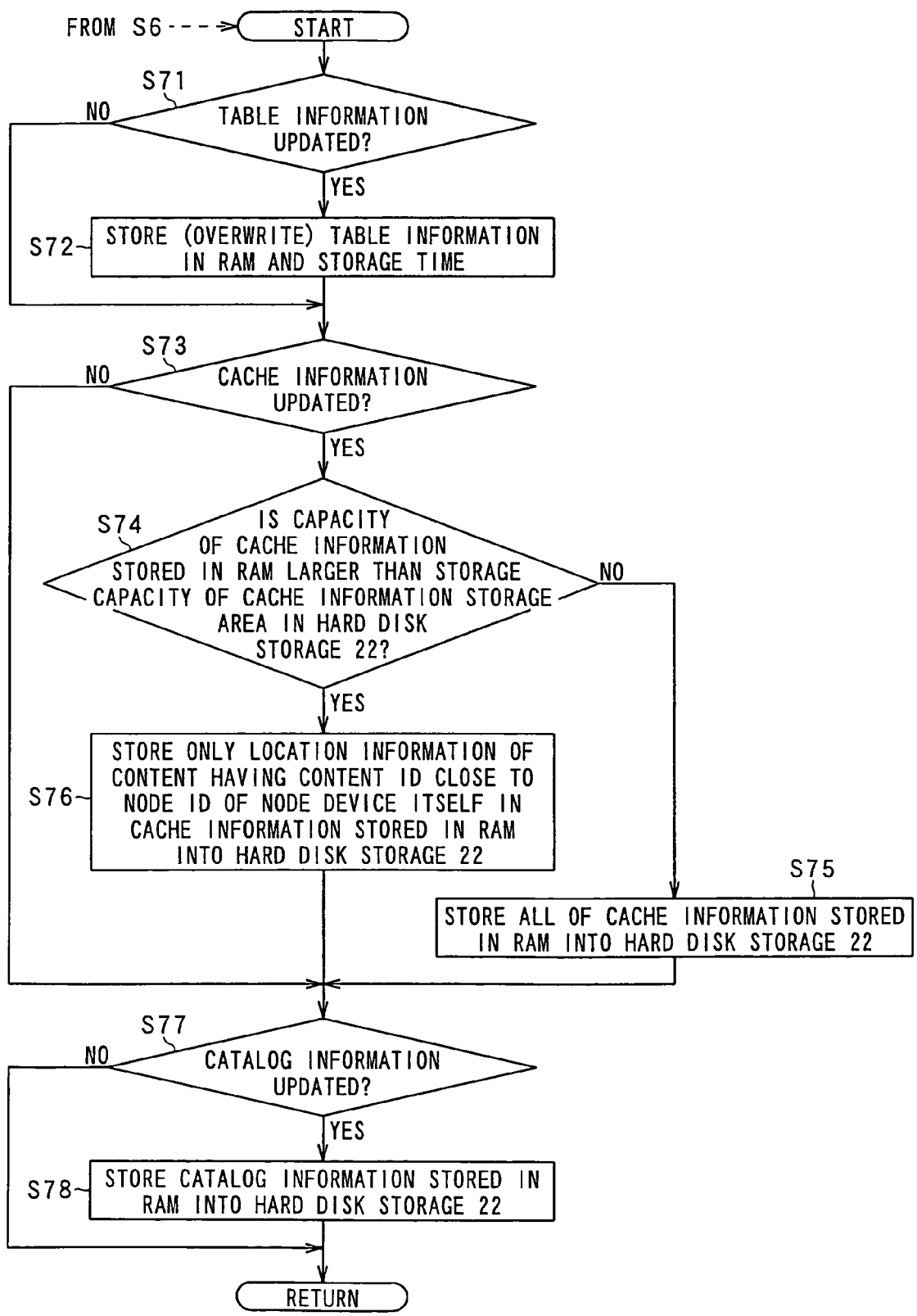
FIG. 12 is a Flowchart showing an example of "process of storing table information, cache information, and catalog information stored in an RAM into a hard disk storing unit 22" in the node device 1.

The process for storing the table information, cache information, and catalog information into the hard disk storage 22 executed in the step S6 will be described with reference to FIGS. 11 and 12.

The table information, cache information, and catalog information stored in the RAM in the controller 11 and used during participation in the content distribution system S is stored into the hard disk storage 22 at a predetermined timing.

A method of storing the information into the hard disk storage 22 every predetermined time and a method of storing the information into the hard disk storage 22 each time any of the table information, cache information, and catalog information is updated in association with transmission/reception of information to/from another node device will be described.

2-3-1. Method of Storing Information Every Predetermined Time

A method of storing table information, cache information, and catalog information every predetermined time into the hard disk storage 22 will be described. FIG. 11 is a flowchart showing an example of "process for storing the table information, cache information, and catalog information stored in the RAM into the hard disk storage 22" executed in step S6.

First, whether predetermined time has elapsed since the process of storing the information into the hard disk storage 22 was performed last time or not is determined (step S61). In the case where the predetermined time has not elapsed (No in step S61), the process is finished. In the case where the predetermined time has elapsed (Yes in step S61), the controller 11 functions as first storage control means. The controller 11 stores the table information in the RAM and storage time into the hard disk storage 22 (step S62), and moves to step S63. In the case where table information stored in the past is stored in the hard disk storage 22, the table information is overwritten.

Next, in step S63, whether cache information is stored in the RAM or not is determined (step S63). In the case where cache information is stored in the RAM (Yes in step S63), whether the capacity of the cache information stored in the RAM is larger than the storage capacity of a cache information storage area in the hard disk storage 22 or not is determined (step S64).

When the capacity of the cache information stored in the RAM is equal to or less than the storage capacity of the cache information storage area in the hard disk storage 22 (No in step S64), all of the cache information stored in the RAM is stored in the hard disk storage 22 (step S65). The controller 11 moves to step S67. On the other hand, in the case where the capacity of the cache information stored in the RAM is larger than the storage capacity of the cache information storage area in the hard disk storage 22 (Yes in step S64), only the location information of content having a content ID close to the node ID of the node device itself in the cache information stored in the RAM is stored in the hard disk storage 22 (step S66).

Subsequently, in step S67, whether catalog information is stored in the RAM or not is determined (step S67). In the case where catalog information is not stored in the RAM (No in step S67), the process is finished. In the case where the catalog information is stored in the RAM (Yes in step S67), the catalog information is stored in the hard disk storage 22 (step S68), and the process is finished.

2-3-2. Method of Storing Information When Updated

A method of storing table information, cache information, and catalog information into the hard disk storage 22 when any of the information is updated will be described. FIG. 12 is a flowchart showing an example of "process for storing the table information, cache information, and catalog information stored in the RAM into the hard disk storage 22" executed in step S6.

First, whether table information stored in the RAM has updated (rewritten) or not is determined (step S71). In the case where the table information is updated (Yes in step S71), the controller 11 functions as first storage control means, and stores the table information in the RAM and the storage time into the hard disk storage 22 (step S72). In the case where there is past table information in the hard disk storage 22, the table information is overwritten. In the case where the table information is not updated (No in step S71), the program moves to step S73.

Next, in step S73, whether cache information is updated (rewritten) or not is determined (step S73). In the case where cache information is not updated (No in step S73), the program moves to step S77. In the case where the cache information is updated (Yes in step S73), whether the capacity of cache information stored in the RAM is larger than the storage capacity of the cache information storage area in the hard disk storage 22 or not is determined (step S74).

When the capacity of the cache information stored in the RAM is equal to or less than the storage capacity of the cache information storage area in the hard disk storage 22 (No in step S74), all of the cache information stored in the RAM is stored in the hard disk storage 22 (step S75). The controller 11 moves to step S77. On the other hand, in the case where the capacity of the cache information stored in the RAM is larger than the storage capacity of the cache information storage area in the hard disk storage 22 (Yes in step S74), only the location information of content having a content ID close to the node ID of the node device itself in the cache information stored in the RAM is stored in the hard disk storage 22 (step S76).

Subsequently, in step S77, whether catalog information is updated (rewritten) or not is determined (step S77). In the case where catalog information is not updated (No in step S77), the process is finished. In the case where the catalog information is updated (Yes in step S77), the catalog information is stored in the hard disk storage 22 (step S78), and the process is finished.

In steps S64 and S74, whether the capacity of the cache information stored in the RAM is larger than the storage capacity of the cache information storage area in the hard disk storage 22 or not is determined. It is also possible to preliminarily determine the number of pieces of location information of content which can be stored in the cache information storage area in the hard disk storage 22. In the case of the cache information having location information of the number larger than the determined number, only the location information of content having a content ID close to the node ID of the node device itself may be stored as cache information into the hard disk storage 22. It is also possible to pre-determine the upper limit of the process time for storing cache information from the RAM to the hard disk storage 22 as storage process time (for example, a few minutes), read the information in order from the location information of the content having the content ID close to the node ID of the node device itself from the RAM and, after lapse of the predetermined storage process time, finish the reading operation.

Further, in the embodiment, the method of storing the information stored in the RAM to the hard disk storage 22 every predetermined time and the method of storing the information into the hard disk storage 22 when the information is updated have been described. As another configuration, for example, when the power-off is recognized in step S4 (Yes in step S4), the information is stored into the hard disk storage 22 and, then, the power source may be turned off.

In the foregoing embodiment, while participating in the content distribution system S, table information stored in the RAM in the controller 11 and used is stored into the hard disk storage 22 so that it can be used at the time of participating in the system next time. The information stored in the hard disk storage 22 is not deleted even after the node device withdraws from the system (even after the power source is turned off). After withdrawal from the system, at the time of participating in the system again, a node device (a node device to which the participation message is to be transmitted) whose table information is to be copied and which is participating in the system is chosen on the basis of the table information stored in the hard disk storage 22. Therefore, without placing the process load on the node device 1CC for contact, the latest table information can be obtained at the time of participation in the system.

At the time of selecting a node device presently participating in the system on the basis of the table information used when the node device participated in the system in the past (table information stored in the hard disk storage 22), a node device having a node ID relatively far from the node ID of the node device itself is selected. With the configuration, by transferring the "participation message" including the node information of the node device itself through a relatively large number of node devices, a relatively large number of node devices can know that the node device participates in the system. The node ID at level 1 in the table information (refer to FIG. 4D) is the furthest from the node ID of the node device itself. The node ID at level 8 is the closest to the node ID of the node device itself. Consequently, it is sufficient to select a node ID relatively far from the node ID of the node device itself from the node IDs written at the level 1.

The first storing means of the invention is not limited to a work RAM but may be a volatile memory whose data stored is lost when the power source is turned off. The second storing means is not limited to the hard disk storage 22 but may be nonvolatile storing means in which information stored during participation in the system is not deleted but remains even after withdrawal from the system (even after the power source is turned off) For example, the second storing means may be a flash memory, an EEPROM (Electronically Erasable and Programmable Read Only Memory), a flash memory, a semiconductor memory with a backup power source, or the like. Further, the second storing means is not limited to a component of the node device 1 such as the hard disk storage 22 but may be an external memory or the like connected to the node device 1.

Although the foregoing embodiment has been described on the precondition that the overlay network 9 constructed by an algorithm using the DHT is employed, the invention is not limited to the precondition but can be also applied to other computer network systems.

The present invention is not confined to the configuration listed in the foregoing embodiments, but it is easily understood that the person skilled in the art can modify such configurations into various other modes, within the scope of the present invention described in the claims.

The invention claimed is:

1. A node device included in an information communication system which comprises a plurality of node devices capable of performing communication with each other via a network,
the node device comprising:
a processor,
a memory configured to store a program to be executed by the processor, and
a first storing unit, which is volatile, that stores link information used for performing communication with another node device, the link information including node information indicative of at least one specific node device;
wherein the processor is configured to execute the program to:
cause the link information stored in the first storing unit to be stored in a second storing unit, which is nonvolatile, at a predetermined timing, while the node device is participating in the information communication system;
cause the link information stored in the second storing unit to be stored in the first storing unit, in response to participating in the information communication system again after withdrawing from the information communication system;
determine if any of the node information out of the node information included in the link information is stored in the first storing unit by the processor;
transmit participation notification for notifying the node device of the node information on the basis of the determined node information;
determine whether transmission of the participation notification succeeded or not; and
determine whether another node information is still included in the link information stored in the first storing unit by the processor or not in response to determining that transmission of the participation notification fails,
wherein in the case where it is determined that the other node information is still included in the link information stored in the first storing unit, the processor transmits the participation notification to the node device corresponding to the other node information included in the link information stored in the first storing unit, and wherein when it is determined that there is no other node information in the link information stored in the first storing unit, the processor transmits the participation notification to a participation management node device for managing participation to the information communication system, which is another node device included in the information communication system, the processor receives from the participation management node device, the link information including the node information of at least one or more node devices included in the information communication system, and the processor stores link information received from the participation management node device in the first storing unit.

2. The node device according to claim 1, further comprising:

a common information storing unit that stores a plurality of common information shared by the plurality of node devices;

wherein the processor transmits a notification of disclosing the common information to any of the node devices of the node information stored in the first storing unit so that the common information stored in the common information storing unit can be shared by another node devices included in the information communication system.

3. The node device according to claim 1, wherein the processor determines whether or not a lapse time elapsed since the time when the processor stored the link information stored in the first storing unit into the second storing unit until the present time is longer than a first predetermined storage time, and wherein in the case where is determined that the lapse time is longer than the first predetermined storage time, the processor transmits the participation notification to the participation management node device.

4. The node device according to claim 1, wherein the processor determines whether or not a lapse time elapsed since the time when the processor stored the link information stored in the first storing unit into the second storing unit until the present time is longer than a second predetermined storage time, wherein in the case where it is determined that the lapse time is within the second predetermined storage time, the processor stores the link information stored in the second storing unit ga4oin the first storing unit.

5. The node device according to claim 4, further comprising:

a common information storing unit that stores a plurality of common information shared by the plurality of node devices;

wherein the processor transmits a notification of disclosing the common information to any of the node devices of the node information stored in the first storing unit so that the common information stored in the common information storing unit can be shared by another node devices included in the information communication system; and the processor determines whether transmission of the disclosure notification succeeded or not.

6. The node device according to claim 5, wherein the processor transmits a participation notification of notifying of participation in the information communication system in response to determining that transmission of the disclosure notification has failed, to the another node device included in the information communication system, which is the participation management node device for managing participation in the information communication system; and the processor receives the link information including the node information of at least one node device included in the information communication system from the participation management node device, and the processor stores the link information received from the participation management node device in the first storing unit.

7. The node device according to claim 1, further comprising:

a common information storing unit that stores a plurality of common information shared by the plurality of node devices;

wherein the processor causes location information indicative of location of the node device that stores the common information to be managed by the node device in the plurality of common information, and common information related information which is related to the plurality of common information shared by the plurality of node devices to be stored in the first storing unit, the processor causes the location information and the common information related information stored in the first storing unit to be stored in the second storing unit at the predetermined timing, and the processor causes the location information and the common information related information stored in the second storing unit to be stored in the first storing unit, in response to participating in the information communication system again after withdrawing from the information communication system.

8. The node device according to claim 1, wherein the predetermined timing is at least any of:

each time a predetermined time elapses;

each time the link information, the location information, or the common information related information stored in the first storing unit is updated in association with transmission or reception of information to or from the other node devices included in the information communication system; and the time when the power source of the node device is turned off.

9. The node device according to claim 1, wherein the node devices are connected via an overlay network in the information communication system, and the node information included in the link information includes a node ID for uniquely identifying a node device of the node information in an identification information space of the overlay network, and destination information of the node device.

10. The node device according to claim 1, wherein the first storing unit is a RAM provided in the node device, and the second storing unit is a hard disk, a flash memory, an EEPROM, or a semiconductor memory with a backup power source.

11. A non-transitory computer-readable recording medium that stores a computer-executable program for a node device included in an information communication system which comprises a plurality of node devices capable of performing communication with each other via a network, the program comprising:

instructions for causing link information stored in a first storing unit which is volatile, to be stored in a second storing unit, which is nonvolatile, at a predetermined timing, wherein the link information is used for performing communication with another node device, and the link information includes node information indicative of at least one specific node device, while the node device is participating in the information communication system;

instructions for causing the link information stored in the second storing unit to be stored in the first storing unit, in response to participating in the information communication system again after withdrawing from the information communication system;

instructions for determining if any of the node information out of the node information included in the link information is stored in the first storing unit;

instructions for transmitting participation notification for notifying the node device of the node information on the basis of the determined node information;

instructions for determining whether transmission of the participation notification succeeded or not; and instructions for determining whether another node information is still included in the link information stored in the first storing unit or not in response to determining that transmission of the participation notification fails, wherein in the case where another node information is still included in the link information stored in the first storing unit, instructions for transmitting the participation notification to the node device corresponding to the other node information included in the link information stored in the first storing unit, and wherein when there is no other node information in the link information stored in the first storing unit, instructions for transmitting the participation notification to a participation management node device for managing participation to the information communication system, which is another node device included in the information communication system, instructions for receiving from the participation management node device, the link information including the node information of at least one or more node devices included in the information communication system, and instructions for storing link information received from the participation management node device into the first storing unit.

12. An information storing method in an information communication system which comprises a plurality of node devices capable of performing communication with each other via a network, the information storing method comprising:

causing link information stored in a first storing unit, which is volatile, to be stored in a second storing unit, which is nonvolatile, at a predetermined timing, wherein the link information is used for performing communication with another node device, and the link information includes node information indicative of at least one specific node device, while the node device is participating in the information communication system;

causing the link information stored in the second storing unit to be stored in the first storing unit, in response to participating in the information communication system again after withdrawing from the information communication system;

determining if any of the node information out of the node information included in the link information is stored in the first storing unit; and transmitting participation notification for notifying the node device of the node information on the basis of the determined node information;

determining whether transmission of the participation notification succeeded or not; and determining whether another node information is still included in the link information stored in the first storing unit or not in response to determining that transmission of the participation notification fails, wherein in the case where the other node information is still included in the link information stored in the first storing unit, transmitting the participation notification to the node device corresponding to the other node information included in the link information stored in the first storing unit, and wherein when there is no other node information in the link information stored in the first storing unit, transmitting the participation notification to a participation management node device for managing participation to the information communication system, which is another node device included in the information communication system, receiving from the participation management node device, the link information including the node information of at least one or more node devices included in the information communication system, and storing link information received from the participation management node device into the first storing unit.

13. A node device included in an information communication system which comprises a plurality of node devices capable of performing communication with each other via a network, the node device comprising:

a processor, a memory configured to store a program to be executed by the processor, and a first storing unit, which is volatile, that stores link information used for performing communication with another node device, the link information including node information indicative of at least one specific node device;

wherein the processor is configured to execute the program to:

cause the link information stored in the first storing unit to be stored in a second storing unit, which is nonvolatile, at a predetermined timing, while the node device is participating in the information communication system;

cause the link information stored in the second storing unit to be stored in the first storing unit, in response to participating in the information communication system again after withdrawing from the information communication system, determine if any of the node information out of the node information included in the link information is stored in the first storing unit by the processor;

transmit participation notification for notifying the node device of the node information on the basis of the determined node information; and delete the node information determined by the processor from the link information stored in the first storing unit in response to determining that transmission of the participation notification fails, wherein the processor determines whether another node information is still included in the link information stored in the first storing unit, wherein in the case where it is determined that the other node information is still included in the link information stored in the first storing unit, the processor transmits the participation notification to the node device corresponding to the other node information included in the link information stored in the first storing unit, and wherein in the case where it is determined that there is no other node information in the link information stored in the first storing unit, the processor transmits the participation notification to a participation management node device, the processor receives the link information including the node information of at least one node device included in the information communication system from the participation management node device, and the processor stores, in place of the link information stored in the first storing unit, the link information received from the participation management node device in the first storing unit.

14. A non-transitory computer-readable recording medium that stores a computer-executable program for a node device included in an information communication system which comprises a plurality of node devices capable of performing communication with each other via a network, the program comprising:

instructions for causing link information stored in a first storing unit which is volatile, to be stored in a second storing unit, which is nonvolatile, at a predetermined timing, wherein the link information is used for performing communication with another node device, and the link information includes node information indicative of at least one specific node device, while the node device is participating in the information communication system;

instructions for causing the link information stored in the second storing unit to be stored in the first storing unit, in response to participating in the information communication system again after withdrawing from the information communication system;

instructions for determining if any of the node information out of the node information included in the link information is stored in the first storing unit;

instructions for transmitting participation notification for notifying the node device of the node information on the basis of the determined node information;

instructions for deleting the determined node information from the link information stored in the first storing unit in response to determining that transmission of the participation notification fails; and instructions for determining whether another node information is still included in the link information stored in the first storing unit, wherein in the case where the other node information is still included in the link information stored in the first storing unit, instructions for transmitting the participation notification to the node device corresponding to the other node information included in the link information stored in the first storing unit, and wherein in the case where there is no other node information in the link information stored in the first storing unit, instructions for transmitting the participation notification to a participation management node device, instructions for receiving the link information including the node information of at least one node device included in the information communication system from the participation management node device, and instructions for storing, in place of the link information stored in the first storing unit, the link information received from the participation management node device into the first storing unit.

15. An information storing method in an information communication system which comprises a plurality of node devices capable of performing communication with each other via a network, the information storing method comprising:

causing link information stored in a first storing unit, which is volatile, to be stored in a second storing unit, which is nonvolatile, at a predetermined timing, wherein the link information is used for performing communication with another node device, and the link information includes node information indicative of at least one specific node device, while the node device is participating in the information communication system;

causing the link information stored in the second storing unit to be stored in the first storing unit, in response to participating in the information communication system again after withdrawing from the information communication system;

determining if any of the node information out of the node information included in the link information is stored in the first storing unit;

transmitting participation notification for notifying the node device of the node information on the basis of the determined node information;

deleting the determined node information from the link information stored in the first storing unit in response to determining that transmission of the participation notification fails; and determining whether another node information is still included in the link information stored in the first storing unit, wherein in the case where the other node information is still included in the link information stored in the first storing unit, transmitting the participation notification to the node device corresponding to the other node information included in the link information stored in the first storing unit, and wherein in the case where there is no other node information in the link information stored in the first storing unit, transmitting the participation notification to a participation management node device, receiving the link information including the node information of at least one node device included in the information communication system from the participation management node device, and storing, in place of the link information stored in the first storing unit, the link information received from the participation management node device into the first storing unit.

* * * * *